United States Patent [19]
Lippel

[11] Patent Number: 4,617,597
[45] Date of Patent: * Oct. 14, 1986

[54] COMPATIBLE COLOR TELEVISION WITH REGENERABLE SIGNALS

[75] Inventor: Bernard Lippel, West Long Branch, N.J.

[73] Assignee: Quanticon Inc., West Long Branch, N.J.

[*] Notice: The portion of the term of this patent subsequent to Jul. 17, 2001 has been disclaimed.

[21] Appl. No.: 784,850

[22] Filed: Oct. 4, 1985

Related U.S. Application Data

[60] Division of Ser. No. 354,138, Mar. 5, 1982, Pat. No. 4,568,966, which is a continuation-in-part of Ser. No. 224,679, Jan. 13, 1981, Pat. No. 4,460,924, Continuation of Ser. No. 897,860, Apr. 19, 1978, Pat. No. 4,275,411.

[51] Int. Cl.$^4$ ............................................. H04N 11/14
[52] U.S. Cl. ................................................... 358/310
[58] Field of Search ................... 358/13, 14, 138, 310, 358/240, 343

[56] References Cited

U.S. PATENT DOCUMENTS

| | | | |
|---|---|---|---|
| 3,562,420 | 2/1971 | Thompson | 358/138 |
| 3,739,082 | 6/1973 | Lippel | 358/138 |
| 3,967,052 | 6/1976 | Judice | 358/240 |
| 4,015,286 | 3/1977 | Russell | 358/13 |
| 4,023,199 | 5/1977 | Netravali et al. | 358/13 |
| 4,275,411 | 6/1981 | Lippel | 358/13 |
| 4,388,655 | 6/1983 | Zenzefilis | 358/343 |
| 4,460,924 | 7/1984 | Lippel | 358/13 |

*Primary Examiner*—John W. Shepperd

[57] ABSTRACT

Novel means are disclosed for conditioning a standard color-television composite signal, such as the NTSC composite, so that pictorial information is represented according to Nyquist samples which are very coarsely quantized and therefore regenerable. This conditioning does not affect compatibility with a standard receiver or perceptibly reduce the quality of a picture displayed thereon. Carefully designed dither, such as 3-dimensional nasik dither, is employed to preserve picture information and quality despite coarse quantization. An improved receiver also regenerates the received signal so that unwanted noise, distortion and interference are removed. The disclosure exemplifies the teachings of the invention in terms of broadcast and cable television systems and video recording systems. An improved videodisk record is disclosed and means whereby, in a pay-television system, the picture incorporated into a standard composite signal may be key-encrypted according to a private cryptographic key.

24 Claims, 17 Drawing Figures

COMPATIBLE COLOR TELEVISION WITH REGENERABLE SIGNALS

This application is a divisional application disclosing and claiming subject matter of my copending application, Ser. No. 354,138, filed Mar. 5, 1982 now U.S. Pat. No. 4,568,966, which is a continuation-in-part of the application Ser. No. 224,679, filed Jan. 13, 1981, now U.S. Pat. No. 4,460,924, entitled "Dither-Quantized Signalling For Color Television," which is a continuation of Ser. No. 897,860 filed Apr. 19, 1978, now U.S. Pat. No. 4,275,411.

SUMMARY AND OBJECTS OF THE INVENTION

Whereas the prior application, now U.S. Pat. No. 4,460,924, discloses disparate types of composite television signals incorporating regenerable component signals according to the invention, the present application relates to certain of said composite television signals which are also compatible with NTSC or related color receivers of the prior art.

An object of the invention as disclosed herein is to transmit, record, or receive television signals in forms suitable for unmodified standard receivers of the NTSC, SECAM or PAL systems, or for the reproducers of conventional video recording systems, as well as for corresponding receivers which have been improved according to the invention.

Another object is to provide novel means whereby I may encrypt, conceal or deface a picture disseminated freely in a compatible composite signal and additional means which enable an authorized receiver to display the picture in the clear and with high quality.

Another object is to provide a novel improved video-disk record storing regenerable composite signals of the invention and compatible both with record reproducers of prior art and with improved reproducers of the invention. A further object is to provide a novel process and novel means useful for manufacture of said record.

BACKGROUND OF THE INVENTION

Most color-television transmitters, including embodiments of the invention, send a composite signal comprising several components, among them a set of video components sufficient for the color picture. A related receiver decomposes the composite signal to extract the set of transmitted video components (or an equivalent set) which it then converts into a colored television display. Because the video components of the NTSC and related systems are simple analog signals, they may be received with corrupting noise and distortions added thereto. The prior applications disclose transmitter means which quantize samples of video components in a manner which does not appreciably impair picture quality but facilitates noise removal in a receiver improved according to the invention.

Except where it is specifically stated otherwise, the set of transmitted components is assumed herein to comprise the luminance signal (designated Y) and the two chrominance signals (designated I and Q) of the NTSC system; likewise, a composite signal having the NTSC format is usually assumed hereinbelow. Persons having normal skill in the art will nevertheless understand that the principles of the invention apply equally to other systems, including the aforementioned SECAM, PAL and video recording systems of prior art.

The prior application, now U.S. Pat. No. 4,460,924 teaches very coarse quantization of samples of one or more of the video components after 3-dimensional dither has been added to prevent perceptible quality loss in the received television picture; this is called "dither coding (or dither quantizing) with 3-dimensional dither." Coarse quantization is conveniently exemplified by four amplitude levels for the luminance and two levels for each chrominance component. When the I and Q components are severely quantized, very few resultant chromaticity values are transmitted. However, it will be clear to persons skilled in the art that 3-dimensional dithers cause the chromaticity sent for a picture element to vary from frame to frame so that temporal averaging of a sequence of frames produces the effect of intermediate chromaticities. Furthermore, mixtures of differently colored elements which appear within small picture areas also produce the perception of intermediate colors, due to subjective spatial averaging.

FIG. 1 illustrates dither coding of an analog signal X, which may be a video component, transmission of the dither-quantized signal over a real channel having conventional television bandwidth, and regeneration of the dither-coded signal. The interval of time shown in FIG. 1 corresponds to a small fraction of one horizontal sweep interval. Vertical grid lines represent instantaneous pulses of an ideal clock signal designated CLX and horizontal grid lines represent four quantum amplitude levels, labelled I, II, III and IV. (Y, I or Q may be substituted for the letter X.) FIG. 1A shows a portion of dither signal DX in relation to clock pulses CLX; the DX waveshape actually changes from line to line and from frame to frame of the scanning raster. Although DX is assumed to comprise NRZ (non-return-to-zero) pulses as shown by the solid line waveshape, narrower pulses, such as those of the dotted curve DX', would also be suitable, provided that the correct amplitude values prevail at all clock-pulse instants.

FIG. 1B represents an analog signal X by a dotted line and the sum X+DX by a solid line. For each clock-pulse instant, there occurs a quantized sample 6 (represented by a solid circle), at the intersection of the vertical grid line (clock pulse) with whichever of the quantum-level lines I, II, III or IV is closest to X+DX. FIG. 1C shows an ideal NRZ signal 3, obtained by storing each sample 6 during the ensuing clock interval. The solid line of FIG. 1D shows a distorted version 4 received when signal 3 is transmitted over a practicable channel. FIG. 1D also shows regenerated but delayed samples 6', obtained by resampling signal 4 midway between the vertical lines and requantizing to the I, II, III and IV levels. Resampling half a period late compensates for the average delay due to storing samples 6 of FIG. 1C for a full clock period. Persons skilled in the art will understand that, in a practical system, it may also be necessary to compensate for minor additional delays, not shown in FIG. 1D. The NRZ signal 3' is derived from samples 6' and is a delayed replica of 3.

In theory, all of the information in a stream of samples generated at the rate of 2W samples per sec. can be transmitted over an "ideal" channel having W Hz. bandwidth; a physically realizable channel, however, requires additional bandwidth. Therefore, the component video signals employed in accordance with the invention have bandwidths slightly less than those of the subchannels over which they are transmitted. Although the NTSC composite signal is designed to accommodate 4.2 MHZ. in the Y subchannel, 1.5 MHZ. in the I subchannel and 0.5 MHZ. in the Q subchannel, narrower signal bandwidths are tolerable and, indeed, are very common in the prior art.

In order to receive samples having the most accurate amplitude values, it is also necessary to equalize the response characteristics of the subchannels as taught, for example, in the book "Transmission Systems for Communications", published by Bell Telephone Laboratories (4th Edition, 1970, pp. 646-656 and 715-718 with references). In many cases, however, inasmuch as requantizing corrects for both channel distortion and noise, it is convenient to forego optimum equalization of each subchannel at a cost of some noise margin.

Best use of the invention requires the use of dithers (called 3-dimensional dithers) which characteristically vary from frame to frame of the television picture in a precise manner which greatly reduces the number of quantum levels needed. It is also important to avoid patterns of dither which produce frame-rate flicker on an interlaced scanning raster or which cause other noticeable picture impairments. Three-dimensional ordered dithers of the nasik species have these required properties and are otherwise convenient. They are therefore assumed in the descriptions herein of exemplary invention embodiments. Nasik dithers are described in my U.S. Pat. No. 3,739,082, entitled "Ordered Dither System".

Videodisk records, and recording and reproducing systems suitable therefore, are well known in the art and are described, for example, in the entire March 1978 issue of *RCA Review*, vol. 39, no. 1 (1978) and in *Philips Technical Review*, vol. 33, No. 7 (1973).

In order that descriptions of various invention embodiments may be facilitated by reference to generic quantizing means, FIG. 2 shows examples of such means suitable both for dither coding and to regenerate dither-coded signals. Assuming zero mean value for dither DX of FIGS. 1A and 1B, it is immaterial whether we dither-code by quantizing the sum $X+DX$, as shown in FIG. 1B, or the difference $X-DX$. For the invention embodiments disclosed hereinbelow, the quantity $X\pm DX$ is sampled as well as quantized, and sampling may occur before or after quantization, or even simultaneously therewith, in synchronism with a clock signal.

Means 415 of FIG. 2A produces binary samples (i.e. samples quantized with only two levels) and means 420 of FIG. 2C quantizes with multiple levels (four levels shown). Each of these means samples and quantizes substantially at the same time and also stores quantized samples so as to generate NRZ output waveshapes. Although NRZ outputs are not essential for the herein-disclosed invention embodiments, they are convenient.

Comparator 401 of FIG. 2A may be a commercial unit of the prior art, assumed to be an integrated-circuit device which includes "strobe" and "latch" functions. Analog signal X is furnished to comparator input 417, dither DX is provided to input 418, and clock signal CLX is furnished to the strobe input 419. While strobed by a clock pulse, unit 401 compares X with DX; if the sampled difference $X-DX$ is negative (corresponding to the left-hand half of FIG. 2B), comparator output $S(X-DX)$ goes "low" to quantum level I, and if the difference is positive (corresponding to the right-hand part of FIG. 2B), $S(X-DX)$ goes "high" to quantum level II. Since the circuit also latches, the output remains at either of these levels between clock pulses, resulting in an NRZ binary signal.

Assuming that dither DX has already been added to analog signal X, FIG. 2C shows 4-level quantizer 420 which samples and quantizes $X+DX$ when clock signal CLX is furnished to lead 411, the strobe input. Common lead 407 furnishes $X+DX$ to one input of each of comparators 403, 404, and 405, which are similar to 401 of FIG. 2A. The second input 408 of comparator 403 is held constant at a reference voltage $+e$, the second input 409 of comparator 404 is held at zero, and the second input 410 of comparator 405 is held at $-e$. Each comparator output goes either high or low, depending on the value of $X+DX$, and the three outputs are added in summing amplifier 406, producing a 4-level quantization characteristic $F(X+DX)$, shown as a dotted-line graph in FIG. 2B.

If $X+DX$ is more negative than $-e$ when a clock pulse occurs, all three comparator outputs go to the low state and remain there until the next clock pulse; $F(X+DX)$ then corresponds to quantum level I. When $X+DX$ is between $-e$ and zero, only output 414 from comparator 405 rises while the other two outputs remain low; $F(X+DX)$ then rests at quantum level II. In similar fashion, level III results when $X+DX$ is between zero and $+e$, and level IV when the input is more positive than $+e$. Because the comparators latch, $F(X+DX)$ is put out as an NRZ signal.

An already-quantized 4-level signal, adjusted so that levels I, II, III and IV respectively correspond to approximately $-3/2e$, $-\frac{1}{2}e$, $+\frac{1}{2}e$, and $+3/2e$, may be resampled and requantizef by applying it to input lead 407 of quantizer 420; this the regeneration process which removes noise. In similar fashion, a binary signal having equally positive and negative quantum levels may be regenerated with 2-level quantizer 415, lead 418 being held at zero potential.

It will be apparent to persons skilled in the art that $-e$, zero, and $+e$ are quantizer decision levels and that, more generally, an N-level quantizer can be constructed in the manner of 420 of FIG. 2C, using $N-1$ comparators and $N-1$ decision levels. Furthermore, the $-e$, zero and $+e$ voltages shown in FIGS. 2A, 2B, and 2C may all be augmented by the same additional voltage, and the high and low output levels of binary quantizer 415 need not be the same as any output levels of multilevel quantizer 420.

It will also be apparent to persons skilled in the art how quantizer 420 is equivalent to, and may be replaced by, an analog-to-digital (a/d) converter followed by a digital-to-analog (d/a) converter such as 508 and 510 of FIG. 13. It can also be implemented with the aid of level-detector devices of commerce and various other staircase-quantizer means of prior art.

CONDITIONING A COMPATIBLE COMPOSITE SIGNAL TO BE REGENERABLE

Figure 3:
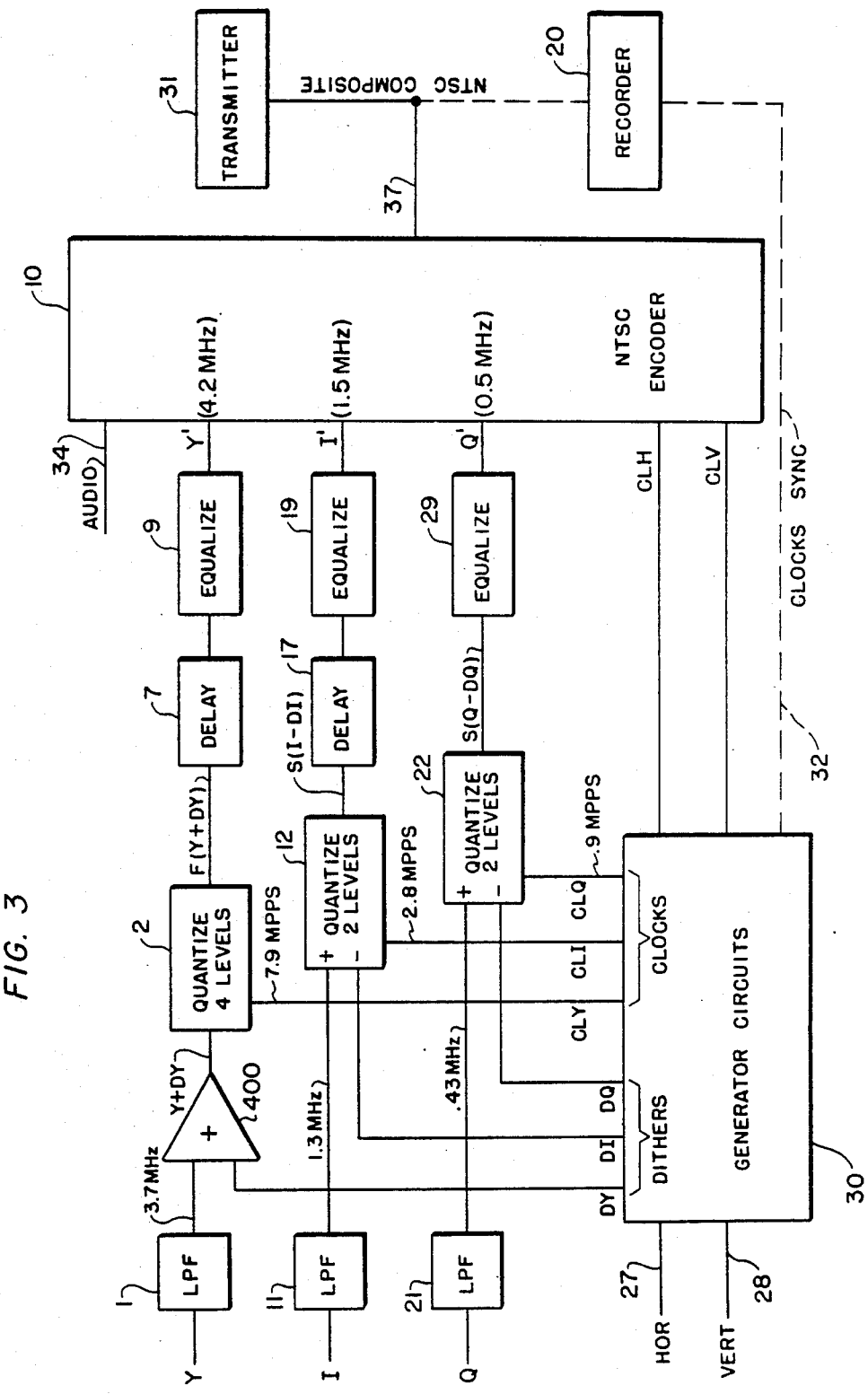
FIG. 3 shows schematically the conditioning process used in a transmitter of the invention to provide an NTSC-compatible composite signal comprising regenerable video components.

Referring to FIG. 3, luminance signal Y, chrominance signals I and Q, horizontal and vertical syncs 27 and 28, and audio 34 may be obtained by decomposing a standard NTSC broadcast signal in an appropriate NTSC decoder, or made available in some equivalent manner.

Figure 1:
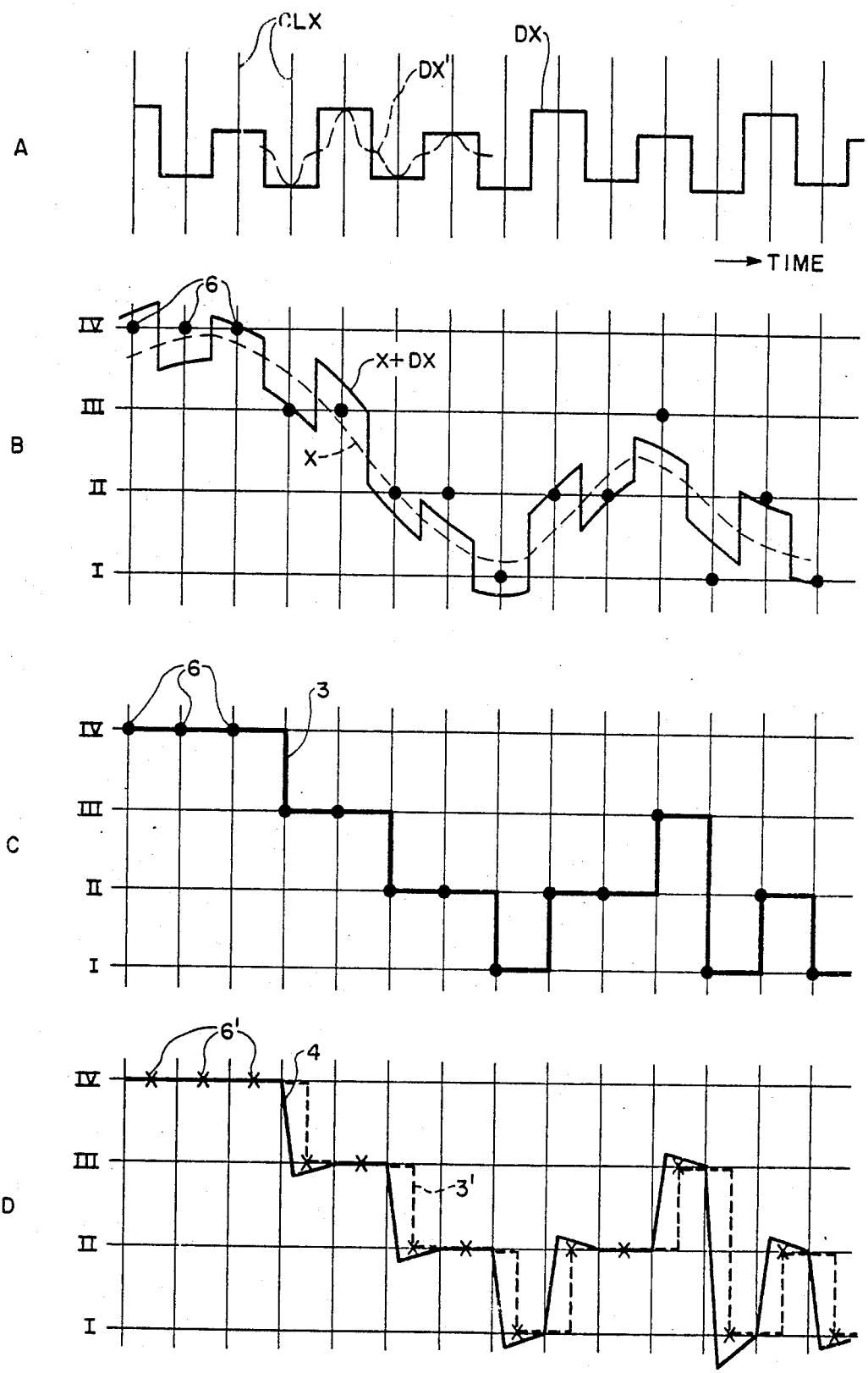
FIG. 1 shows ideal waveshapes and samples relating to dither-coding of an analog signal and regeneration of the dither-coded signal after it has been transmitted over a bandlimited real channel.

Generator unit 30, which will be discussed in detail later, locks onto horizontal sync 27 and delivers all required dithers and clock signals synchronous therewith, as well as horizontal sync CLH and vertical sync CLV which NTSC encoder 10 incorporates into conditioned composite signal 37. Some embodiments of generator 30, including that of FIG. 6 described below, supply CLH and CLV sync signals which have been regenerated by means of phase-lock techniques, while in other embodiments CLH and CLV are respectively the same as horizontal sync input 27 and vertical sync input 28. Dithers are designated DY, DI and DQ on the figure and clock signals (also called clocks) are designated CLY, CLI and CLQ, the appropriate letter, Y, I or Q, being substituted for X of FIG. 1. The three clocks have three different pulse rates, but dither DY has the same pulse rate as clock CLY, DI the same rate as CLI, and DQ the same rate as CLQ.

Inasmuch as the NTSC Y-subchannel has 4.2 MHz. bandwidth (indicated in parenthesis on encoder 10 of FIG. 3), low-pass filter 1 removes frequencies higher than approximately 3.7 MHz. from luminance input Y which is added to Dy in summing amplifier 400. The sum Y+DY goes to 4-level quantizer 2 along with clock CLY. Quantizer 2 may be identical with quantizer 420 of FIG. 2C. The pulse frequency of CLY is shown to be 7.9 Mpps. ($7.9 \times 10^6$ pulses per second); this corresponds to a Nyquist frequency of 3.95 MHz., which is less than the 4.2 MHz. subchannel bandwidth but higher than the 3.7 MHz. signal bandwidth. A 4-level output signal from unit 2, F(Y+DY) (similar to signal 3 of FIG. 1C) is retarded in delay unit 7 and the delayed signal Y' is furnished to the normal Y input of NTSC encoder 10 for transmission on the 4.2 MHz. Y subchannel. Optionally, the frequency characteristic of the subchannel may be adjusted by means of an equalizing network 9, of referenced prior art, to minimize intersymbol interference and otherwise to facilitate resampling with maximum accuracy in a receiver.

Figure 2A:
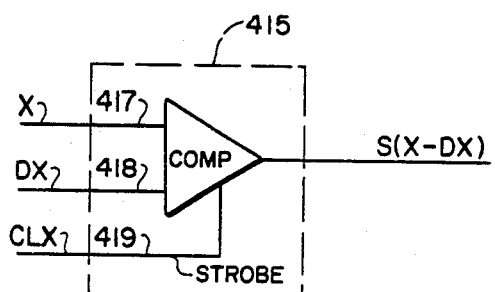
FIGS. 2A-2C show a 2-level quantizer and a multi-level quantizer suitable for use in the invention, also graphs of their input-output characteristics.

In similar fashion, chrominance input I is low-pass filtered with filter 11 to remove frequencies higher than approximately 1.3 MHz. before being provided, together with DI and CLI, to 2-level quantizer 12 which may be the same as quantizer 415 of FIG. 2A. In this case, unit 12 quantizes the NRZ output signal onto only two quantum levels. The pulse rate of CLI and DI is 2.8 Mpps., corresponding to Nyquist frequency of 1.4 MHz. The NRZ binary signal S(I−DI) is retarded in delay unit 17 and (optionally modified in equalizer network 19) is furnished as I' to the normal I-input of encoder 10, to be transmitted over the 1.5 MHz. I-subchannel. Finally, the Q component is bandlimited to approximately 0.43 MHz. and dither-quantized with 2-level quantizer 22 to obtain Q'. The rate of DQ and CLQ is 0.9 Mpps., corresponding to 0.45 MHz. Nyquist frequency which is less than the 0.5 MHz. bandwidth of the Q-subchannel. The Q' signal is presented directly to optional equalizer network 29 or to encoder 10.

The amount of delay in each of the two delay units 7 and 17 is preferably adjusted to make the overall Y—Y' and I—I' delays substantially equal to the Q—Q' delay which, owing to the 0.9 Mpps. sampling rate, is approximately 0.55 microsecond. Equalization of the Y—Y', I—I' and Q—Q' delay times insures that a standard receiver of prior art can display all luminance and chrominance components in proper register.

It will be recognized that low-pass filters 1, 11 and 21 can be dispensed with if the Y, I and Q input signals of FIG. 3 are obtained from a source which does not provide the unwanted high frequencies. It will also be recognized that the optional equalizers 9, 19 and 29 may be located elsewhere in the respective subchannels. They may also be provided in simplified, approximate, or degenerate form, or omitted entirely, with corresponding loss of signal-to-noise margin in noise-reducing receivers of the invention. Furthermore, delay units 7 and 17, may be located ahead of the respective quantizers, combined with equalizers 9 and 19 or be otherwise provided for, without departing from the spirit of the invention.

The conditioned composite signal 37 from NTSC encoder 10 may be transmitted by means of a radio or cable transmitter 31, recorded by means of a recorder 20, or otherwise utilized like an NTSC composite signal of prior art.

Inasmuch as both I' and Q' are quantized with two levels in FIG. 3, the vector quantity (I',Q') has only four possible values for representing chromaticity in composite signal 37. Persons skilled in the art will readily understand, however, that when DI and DQ are 3-dimensional dithers, an observer perceives a large gamut of colors on a television set receiving the composite signal, owing to temporal and spatial averaging effects in the human psychovisual system.

Figure 8:
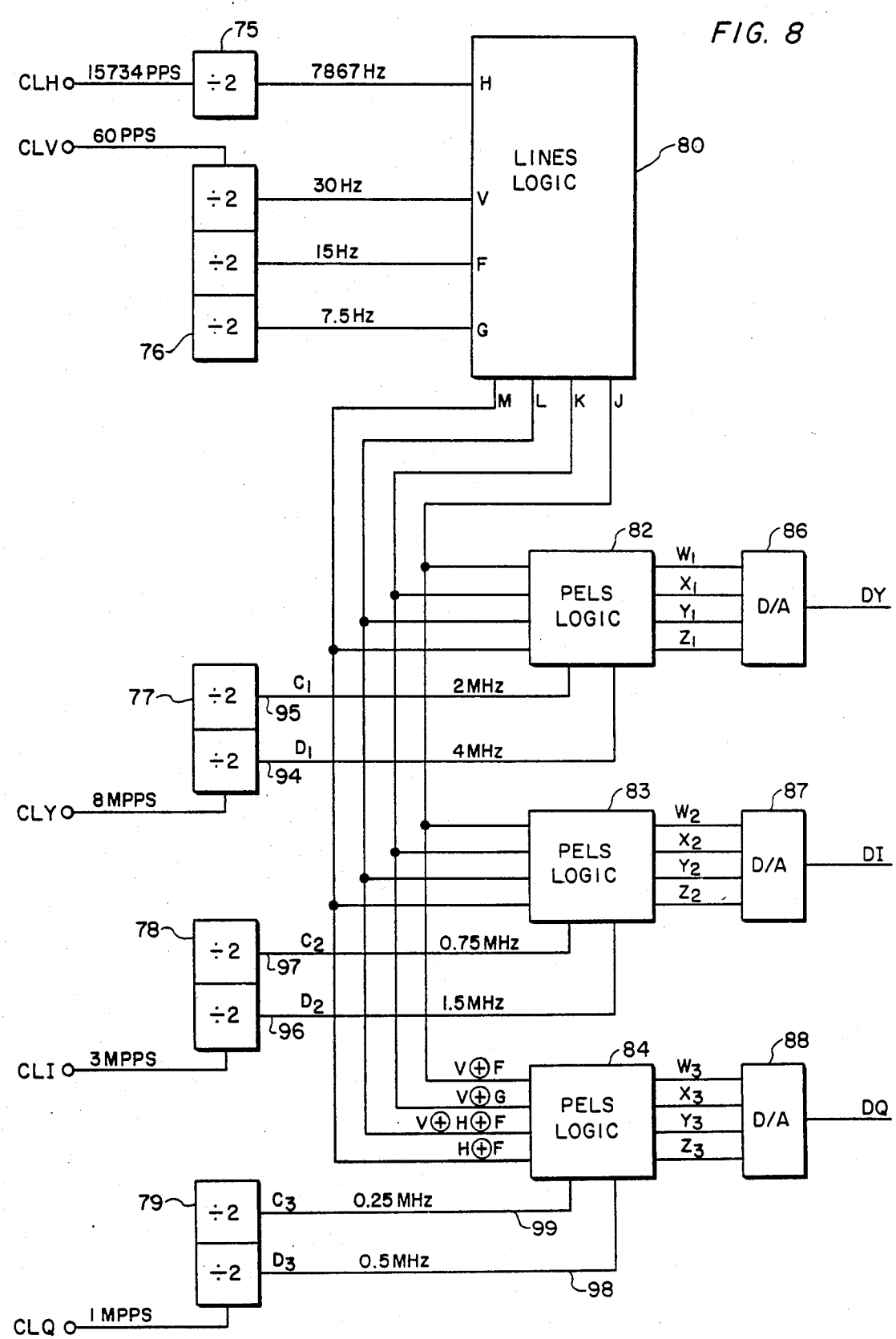
FIG. 8 is a schematic diagram representing one suitable means for generating dithers for the conditioning system of FIG. 3.
Figure 15:
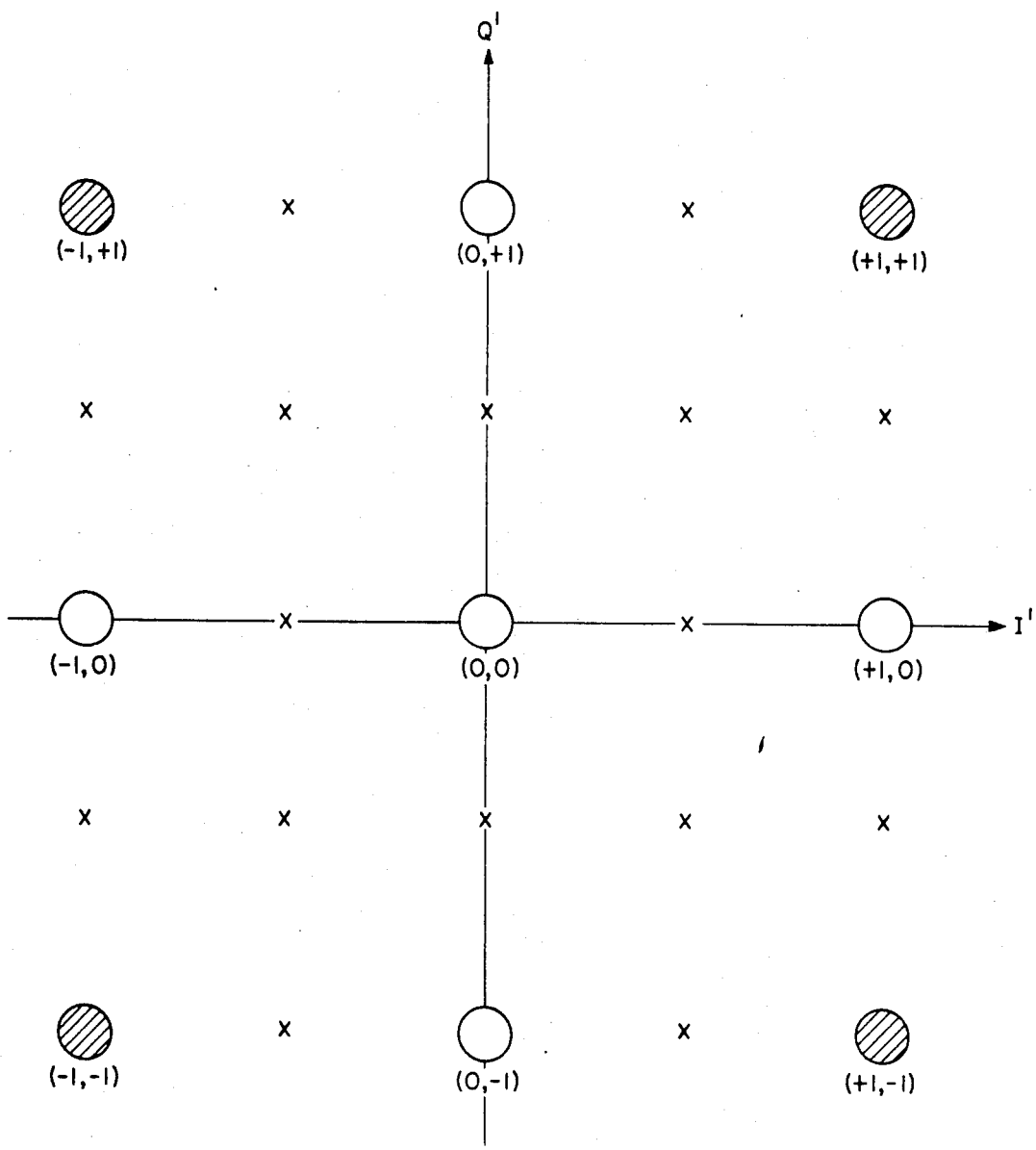
FIG. 15 conveniently illustrates by example one of the mechanisms that increase the number of colors perceived subjectively when chrominance signals are coarsely quantized according to the invention.

For quantitatively evaluating the the temporal averaging at a single picture element (pel), FIG. 15 is convenient. Let the quantum levels of both I' and Q' be ±1: During the scanning of one television frame, the only transmitted chromaticities correspond to $(-1,-1)$, $(-1,+1)$, $(+1,-1)$ and $(+1,+1)$; these are denoted by four shaded circles on FIG. 15. However, the pel situated at a particular point of the scanning raster may receive different chromaticities on two successive frames because DI and DQ will have changed in the transmitter. The two-frame averages therefore include five additional mean chromaticities, denoted by open circles like that corresponding to $(0,-1)$. Furthermore, 4-phase dithers (e.g. those generated as shown in FIG. 8) provide another sixteen mean values, denoted by x's on FIG. 15, making a total of 25 mean chromaticities that a single pel can have when four successive frames are averaged.

Also, when DI and DQ have more amplitude sizes than dither phases (as when generated according to FIG. 8), neighboring pels usually have different mean chromaticities. This will be seen to result in in a pointillistic display wherein still more colors can be perceived because of spatial averaging.

Persons having normal skill in the art will also understand that, although FIG. 3 particularly refers to the NTSC system and its Y, I and Q component signals, the same principles apply to other conventional systems. Furthermore, I may sometimes dither code only the chrominance components, or one of them, for more accurate control of color; or I may dither-code a luminance component only; or I may dither-code a set of component signals other than Y, I and Q, but sufficient for a color picture.

NOISE-REDUCING RECEIVER

Figure 4:
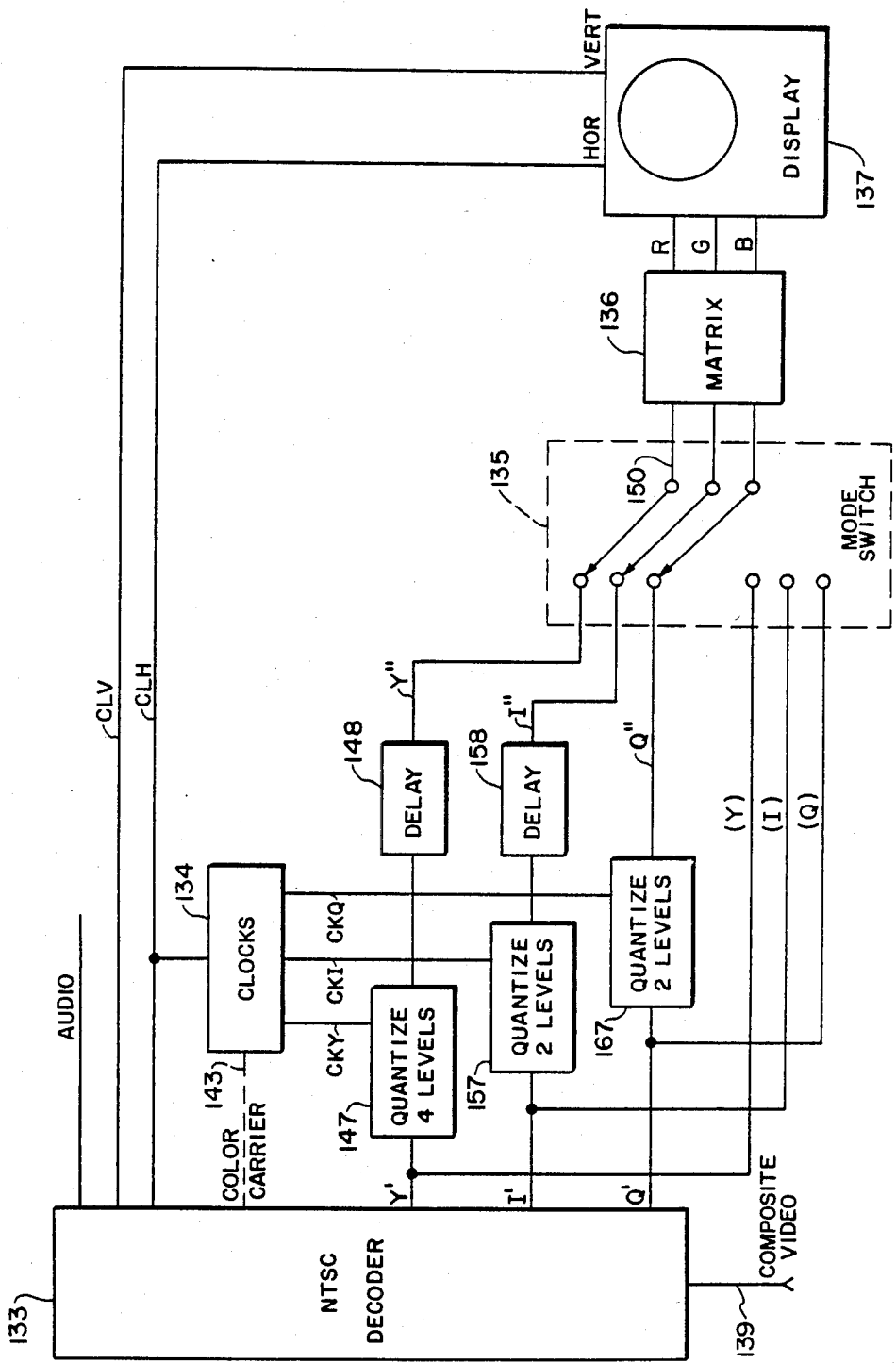
FIG. 4 shows a television receiver arranged to receive any NTSC-compatible color-television picture, and also to regenerate video components of a composite signal conditioned according to FIG. 3.

FIG. 4 schematizes a television receiver improved according to the invention. It operates that a conventional NTSC receiver when switch 135 is set to the lower position, while the upper switch position provides a noise-reducing mode of operation for signal 37 of FIG. 3. With the switch set to the lower position (not as depicted), either a standard NTSC composite signal or conditioned composite signal 37 of FIG. 3 is acceptable. This switch setting is preferred for the standard signal, in order that the standard Y, I and Q components (indicated in parentheses) shall not be coarsely quantized when supplied to matrix 136. On the other hand, when the composite signal of the invention is received, only the upper switch position regenerates Y', I' and Q' to combat channel noise and distortion.

FIG. 4 assumes that composite signal 37 of the invention is supplied to input 139 of NTSC decoder 133; therefore, switch 135 is shown set to the upper position. Dither-quantized luminance and chrominance components Y', I' and Q' are put out by the decoder on correspondingly labelled leads. Clocks generator 134 is similar to clocking means incorporated into generator 30 of FIG. 3, to be described later. As will appear later, some embodiments of the clocks generator are synchronized with CLH (using the solid-line connection of FIG. 4) but other embodiments require the color carrier to be brought out from decoder 133 on lead 143 (shown dotted). Clock signals CKY, CKI and CKQ from generator 134 have substantially the same clock rates, respectively, as CLY, CLI and CLQ of FIG. 3, but each is preferably adjusted in phase for optimum resampling of its associated video component.

Figure 2B:
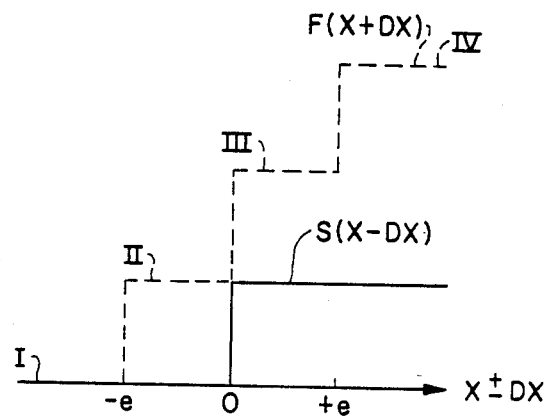
Figure 2C:
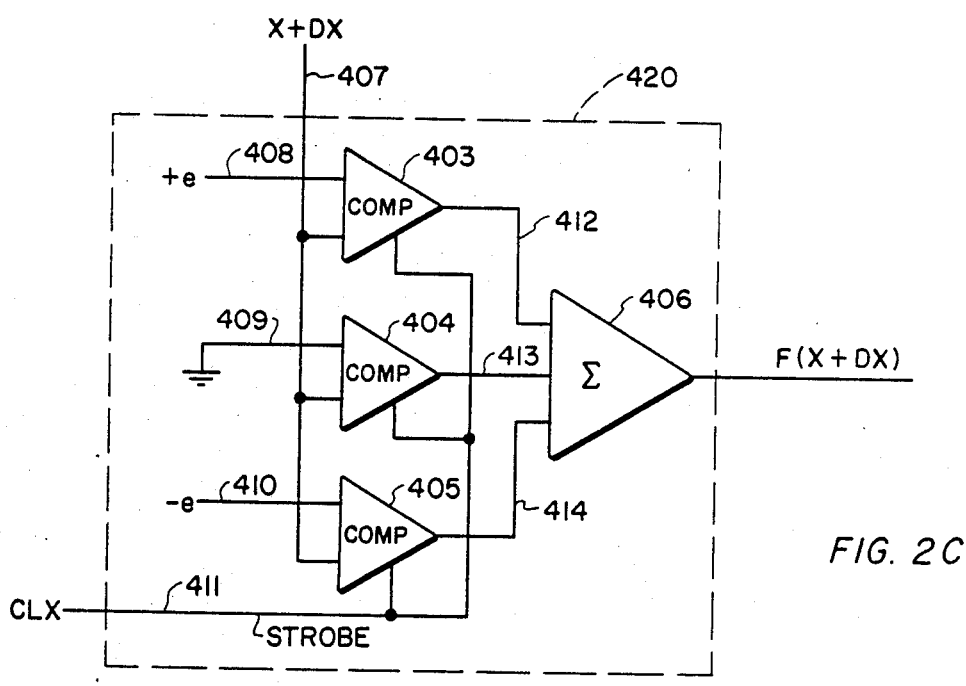

Four-level quantizer 147 of FIG. 4 may be similar to quantizers 420 of FIG. 2C and 2 of FIG. 3. It receives Y' from decoder 133 and CKY from clocks generator 134 and removes the effects of channel noise and distortion from Y' (unless they are excessive, corresponding to instantaneous amplitude errors of approximately one-half quantizer step or larger). Referring to FIG. 2C, Y' may be supplied to input 407 and CKY to input 411 of quantizer 420, the voltages on leads 408, 409 and 410 being adjusted to requantize Y' with decision points and quantum levels corresponding to those of quantizer 2 of FIG. 3. The regenerated NRZ luminance signal, Y" of FIG. 4, similar to 3' of FIG. 1D, is retarded in delay unit 148 before being supplied by means of switch 135 to input 150 of matrix 136.

In the meantime, the binary quantized chrominance signal I' from the decoder is regenerated in 2-level quantizer 157 and the binary quantized chrominance signal Q' is likewise regenerated in 2-level quantizer 167. Quantizers 157 and 167 may be similar to quantizer 415 of FIG. 2A with input 418 maintained at a fixed potential. Assuming that said inputs are at zero potential, all negative I' and Q' samples are requantized onto one level, all positive samples are requantized onto another level, and the regenerated outputs are NRZ binary signals because comparators 401 also operate as latches.

In particular, 2-level quantizer 157 of FIG. 4 receives chrominance signal I' from decoder 133 and clock CKI from clocks generator 134 and delivers a regenerated version of I' to delay unit 158. The delayed signal, denoted I", is supplied through switch 135 to matrix 136. Also, 2-level quantizer 167 receives Q' and CKQ and delivers its NRZ output, designated Q", directly to switch 135 and thence to matrix 136.

In the absence of compensating delays, I" would lag behind Y", and Q" would lag behind both, owing to the progressively longer clock periods of CKY, CKI and CKQ. Delay units 148 and 158 are therefore adjusted to equalize the delays between decoder 133 and matrix 136. This permits proper register of the Y", I" and Q" component pictures on display unit 137.

Decoder 133, matrix 136, horizontal sync CLH, vertical sync CLV and display unit 137 are substantially according to well-known prior art and therefore need not be described further.

CLOCKS GENERATOR MEANS

Figure 5:
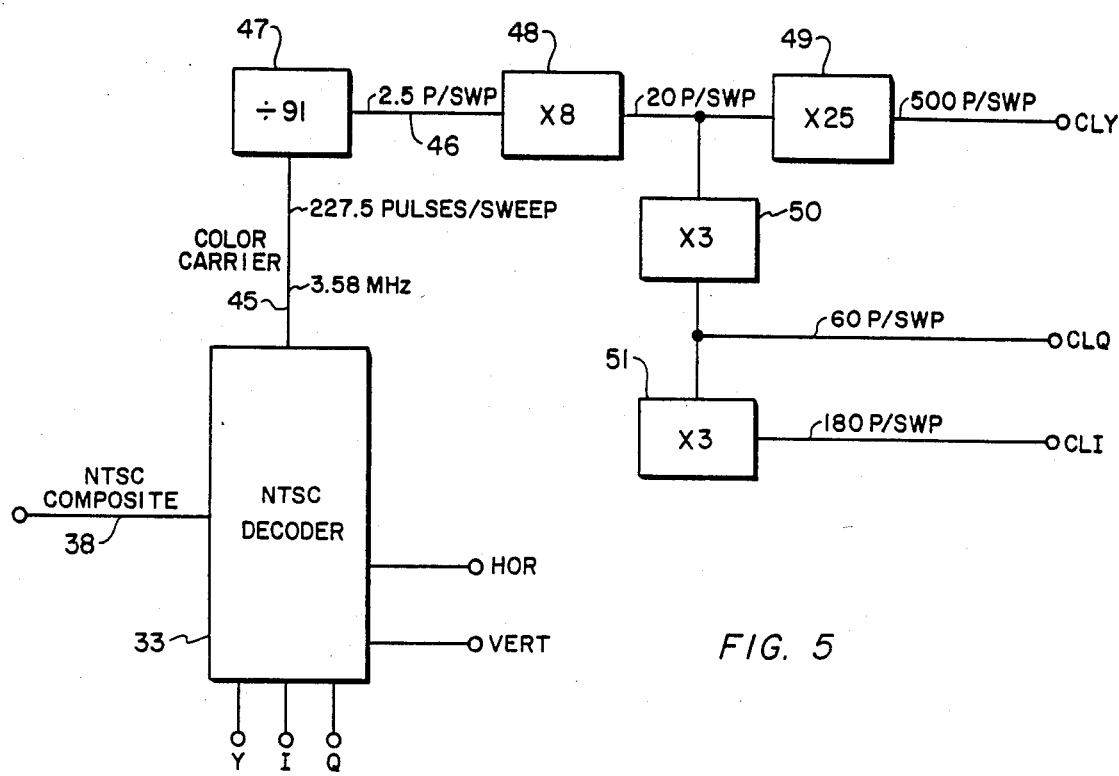
FIGS. 5, 6 and 7 show alternative embodiments of a clocks signal generator suitable for both the transmitter of FIG. 3 and the receiver of FIG. 4.
Figure 7:
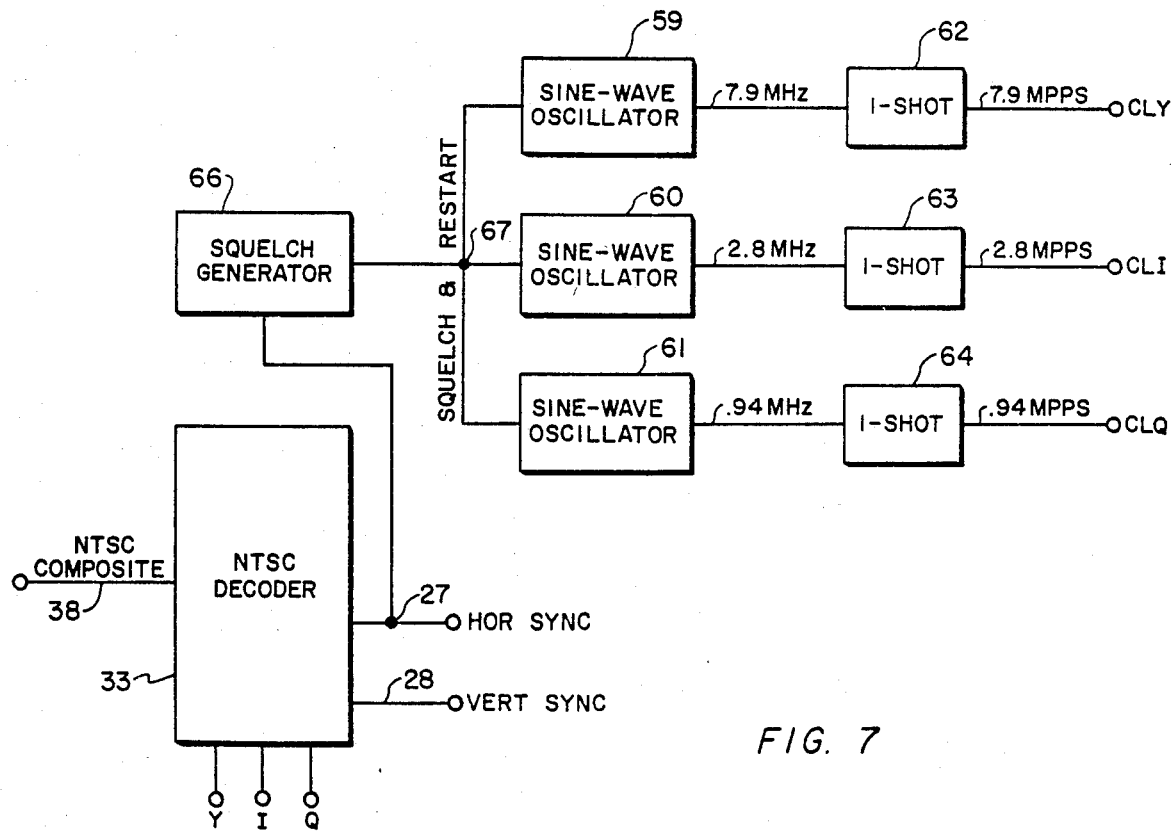
Figure 6:
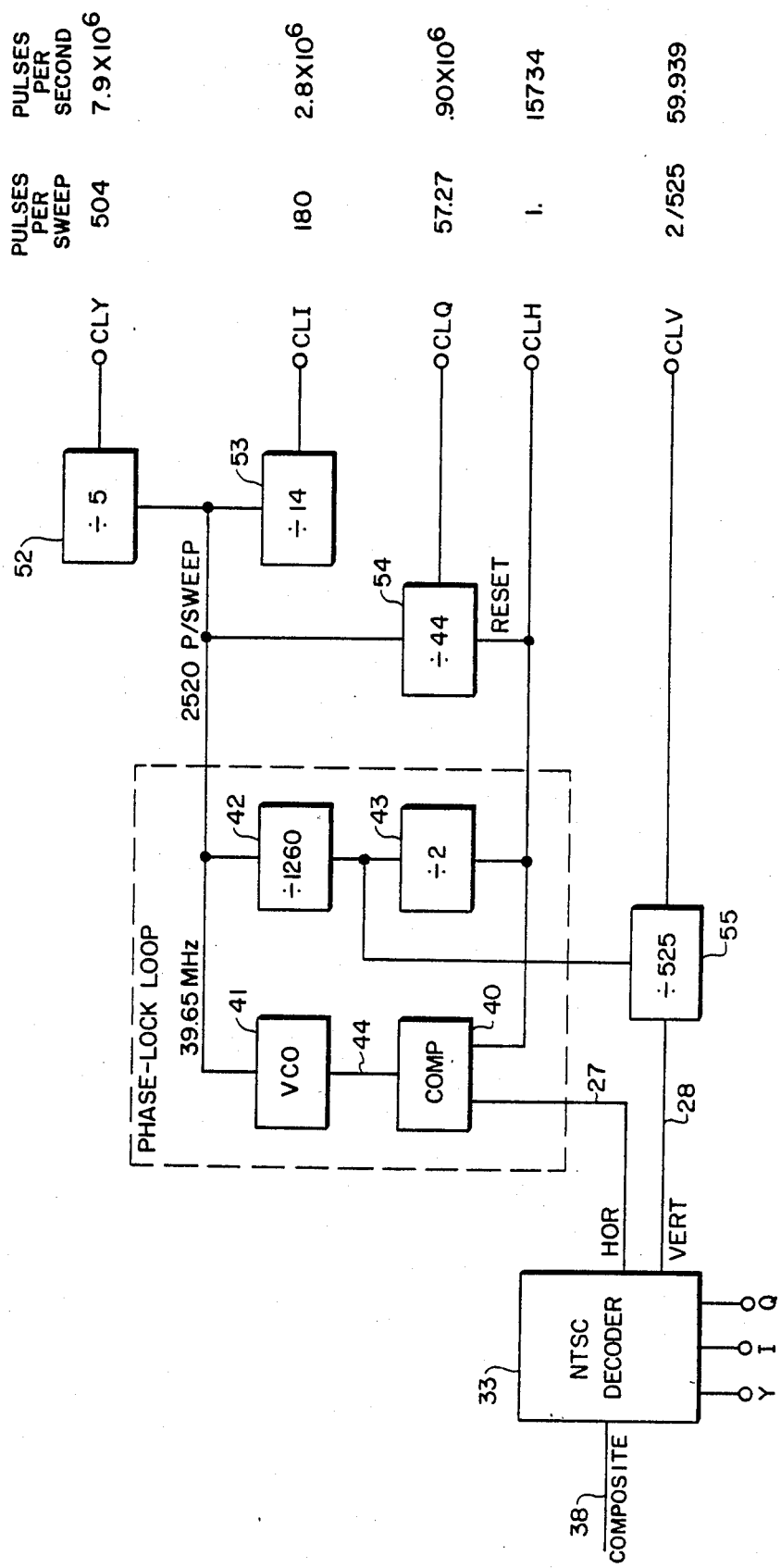

Generator means 30 of FIG. 3, may combine a clocks generator with dithers-generating means of FIG. 8. FIGS. 5, 6 and 7 exemplify different clocks generator embodiments suitable to be incorporated into said means of FIG. 3 and also suitable for clocks generator 134 of FIG. 4. Clock frequencies are preferably identical in corresponding clocks of transmitter and receiver, but with phases adjusted for optimum resampling in the receiver. Inasmuch as means for adjusting the phase of a clock signal are well known to persons skilled in the art, they have been omitted from FIGS. 5, 6 and 7, the better to show essential operating principles. Although the output clock signals are labelled only CLY, CLI and CLQ, in FIGS. 5, 6 and 7, it will be understood that the CKY, CKI and CKQ clocks of the receiver may be obtained by similar means.

It is very preferable that all clock signals be synchronized with horizontal sync CLH and vertical sync CLV in such manner that the picture elements sampled with any clock form a uniform rectangular array on the television picture raster. In particular, there should be a picture sample at every intersection of a set of uniformly-spaced vertical lines with the horizontal scanning lines of the raster. The array of samples should also remain stationary from frame to frame, so that no movement is perceptible during any one-half second interval, or thereabout; this insures proper register of the dither-coded picture samples of successive television frames.

I can obtain such a stationary rectangular array by making the clock frequency an exact integral multiple of the horizontal sweep frequency (15,734 sweeps/sec.); this is shown in FIG. 5 and for CLY and CLI of FIG. 6. Alternatively, I may resynchronize a stream of constant-frequency clock pulses to the start of every horizontal sweep; this is shown in FIG. 7 and for CLQ of FIG. 6.

Clocks generated according to FIG. 5 make use of the fact that the NTSC composite-signal decoder 33, of prior art, generates internally a color carrier which it maintains at a frequency almost exactly 227.5 times that of the horizontal sweep frequency. In the system exemplified by FIG. 5, decoder 33 decomposes composite signal 38 to extract the component signals shown as inputs in FIG. 3. In addition, the color carrier is brought out from the decoder on lead 45, and cycles thereof are continually counted in counter 47 which acts as a frequency divider and delivers one pulse on lead 46 for every 91 cycles of the color carrier. Since 227.5=2.5×91, this corresponds to 2.5 pulses per sweep interval. Frequency multiplier 48 multiplies this pulse rate exactly eight-fold, whereby 20 pulses per sweep interval are supplied both to frequency multiplier 49 and to frequency multiplier 50. The four frequency multipliers 48-51 may be any of the multi-vibrators, relaxation oscillators or phase-locked multipliers of well-known prior art, each synchronized by constant-frequency input pulses and putting out exactly N output pulses for each input pulse, where N is a fixed integer equal to eight in unit 48. Frequency multiplier 49 receives 20 pulses/sweep interval from multiplier 48 and delivers CLY with 500 pulses/sweep interval, corresponding to N=25, while multiplier 50 multiplies the same input by three and delivers CLQ with 60 pulses/sweep. Finally, frequency multiplier 51 multiplies the CLQ frequency threefold, producing CLI with 180 pulses/sweep.

Since the NTSC horizontal sweep frequency is 15,734 sweeps/sec., the CLY pulse rate in the example of FIG. 5 is 15,734×500=7.867 Mpps., the CLI pulse rate is 15,734×180=2.83 Mpps., and the CLQ rate is 15,734×60=0.944 Mpps.

FIG. 6 shows by example the manner in which a slightly different set of clock signals can be generated, using a phase-lock system which also regenerates and stabilizes the horizontal and vertical sync signals. The dotted rectangle 56 encloses a phase-lock loop constructed according to well-known art and comprising voltage controlled oscillator 41, tandem counters 42 and 43, and phase comparator 40. Filter means commonly employed in the art may be incorporated into the phase comparator.

NTSC decoder 33 decomposes NTSC composite signal 38 into various signals including Y, I and Q, horizontal sync 27 and vertical sync 28. In accordance with well-known phase-lock principles, comparator 40 continually compares pulses of incoming horizontal sync 27 with those of outgoing horizontal sync CLH and accordingly adjusts the control voltage it sends on lead 44 to voltage-controlled-oscillator (VCO) 41. The oscillator frequency is thereby controlled in such manner that output sync CLH locks onto input sync 27 and remains locked without necessarily following short-period jitter. CLH is obtained by counting oscillations of VCO 41 in divide-by-1260 counter 42 followed by divide-by-two counter 43. Hence, one CLH pulse appears for every 2520 oscillations of VCO 41 and, the equilibrium frequency of VCO 41 is therefore 15,734×2520, or very nearly 39.65 MHz.

Frequency-dividing counters 52, 53 and 54 are outside the phase-lock loop but each has the same input as counter 42. Counter 52 divides by five and produces CLY with 2520/5 or exactly 504 pulses during each sweep interval between CLH pulses; this corresponds to 15,734×504=7.93 Mpps. Counter 53 divides by 14 and, in like fashion produces CLI with exactly 180 pulses during each sweep interval, corresponding to 2.83 Mpps. Counter 54 divides by 44, corresponding to 0.90 Mpps., which is the CLQ pulse rate during active sweep. However, dividing 2520 by 44 gives 57.2727 which is not an integer. Therefore counter 54 is reset, as shown, by every CLH pulse, in order that samples from CLQ (or CKQ) pulses occupy the same horizontal positions on every line of the scanning raster. Although such resetting causes a momentary change in pulse rate, this is acceptable because it occurs during a blanking period.

It may be noted that counter 54 could have been arranged to divide by 42 to produce CLQ with exactly 60 pulses per sweep, in which case the resetting connection would not be needed. The CLQ pulse rate would then be 0.94 Mpps., just as in FIG. 5.

The pulses at the input to counter 43 have twice the CLH rate, or 31,468 pps. These pulses are also counted in divide-by-525 counter 55 whose recycling is also synchronized with vertical sync 28 from decoder 33. The output from counter 55 is vertical sync CLV, whose frequency is 31,468/525=59.939 pps. (approximately 60 pps.), as required for the NTSC system.

The clocks generator embodiment exemplified by FIG. 7 operates in yet another manner. Oscillators 59, 60 and 61 are each fitted with a control input connected at connection point 67 to the output of squelch generator 66. The oscillators are of well-known prior art, preferably sine-wave oscillators, each arranged so that (a) oscillation is prevented, and lingering oscillations are quickly damped out, whenever the potential of point 67 is in one range, assumed for convenience to be the range of negative voltages; (b) oscillation occurs at a reproducible and substantially constant frequency whenever the potential of point 67 falls into another range, assumed to be the range of positive voltages, and (c) a rapid change from negative to positive at point 67 shocks the circuit into oscillation, and the phase of the sine-wave signal relative to the time of shock is substantially fixed.

In FIG. 7, NTSC decoder 33 decomposes composite input signal 38 and furnishes video components, horizontal sync 27 and vertical sync 28. The horizontal sync is also furnished to squelch generator 66 as shown. As persons skilled in the art well know, the NTSC composite signal includes an ideally rectangular horizontal sync pulse which has duration of about five microseconds and is approximately contemporaneous with horizontal retrace on the scanning raster of the receiver. The beam blanking period, corresponding to the composite-signal "blanking pedestal", starts about one microsecond earlier and ends about four microseconds later. Squelch generator 66 includes circuitry of prior art which generate a squelch and restart signal provided at point 67 to control all three oscillators. It may comprise a one-shot multivibrator whose quiescent output is positive. When triggered by the leading edge of horizontal sync 27, unit 66 emits a negative pulse having, say, seven microseconds duration and a sharp trailing edge. The negative signal (squelch pulse) damps out all residual oscillations in oscillator 59, 60 and 61, but its return to normal positive polarity causes the oscillations to resume. Rapid transition from negative to positive on the trailing edge of each squelch pulse excites oscillations having the same phase on all horizontal lines of the scanning raster. These oscillations persist with substantially constant frequency and amplitude during active scan (at which time the picture is being generated), but the next squelch pulse damps them out.

In the example of FIG. 7, the frequencies of oscillators 59, 60 and 61 and the operation of multivibrators 62, 63 and 64 are chosen such that CLY, CLI and CLQ have the clock frequencies shown in FIG. 3 but they are readily adjustable to other values. Specifically, the frequency of oscillator 59 is 7.9 MHz. and 62 is a one-shot multivibrator arranged to trigger on only positive-going (or only negative-going) axis crossings of the sine wave and to generate a clock pulse every time it triggers; therefore, CLY has 7.9 Mpps. pulse frequency. It will be clear to those skilled in the art that I may obtain substantially the same clock signal by generating only half the sine-wave frequency and triggering clock pulses on both positive-going and negative-going edge transitions, as well as by other related methods of prior art.

Likewise, oscillator 60 of FIG. 7, has 2.8 MHz. frequency and oscillator 61 has 0.94 MHz. Multivibrators 63 and 64 are similar to multivibrator 62, whereby CLI has 2.8 Mpps. and CLQ 0.94 Mpps. pulse rate.

FIGS. 5, 6 and 7 are illustrative, and variations thereof in the spirit of the invention will occur to persons skilled in the art. Since the clock frequencies shown in FIGS. 3 and 4 are also illustrative, simplification can be effected by employing CLY, CLI and CLQ pulse frequencies in the ratios of 9:3:1, the Y, I and Q bandwidths being tailored accordingly.

The clocks generators exemplified in FIGS. 5, 6 and 7 are suitable for both signal conditioning as in FIG. 3 and regeneration as in FIG. 4. Clocks for regenerating conditioned video signals played back from a record may alternatively be derived from a special record track, disclosed in the prior application, now U.S. Pat. No. 4,460,924. The dotted line 32, from means 30 to recorder 20 of FIG. 3, suggests the recording of such a track. Novel videodisk recording equipment combined with another kind of dithers- and clocks-generation means is described below.

The input signals of FIG. 3 may come directly from camera means, instead of from the transmitted composite signal 38 and decoder 33 shown in FIGS. 5, 6 and 7. For such case in a monochrome system, my U.S. Pat. No. 3,739,082, entitled "Ordered Dither System", teaches the use of an independent clock to generate both raster scanning and dither coding in combination, and persons skilled in the art will readily perceive how I can adapt such teaching to the NTSC color system.

COMMON GENERATION OF DITHERS

The prior application, now U.S. Pat. No. 4,460,924, explains that 3-dimensional nasik dither, although not essential, is preferred for television displays and is especially suitable for the NTSC and other standard systems, since they employ scanning rasters having 2:1 lines interlace. Whereas the prior application discloses the separate generation of different nasik dithers for each of a plurality of video components, FIG. 8 herein shows means for obtaining DY, DI and DQ wherein a major part of the processing is performed for all three nasik dithers in common.

Although the frequencies of clock inputs to FIG. 8 are conveniently shown as 8 Mpps. for CLY, 3 Mpps. for CLI, and 1 Mpps. for CLQ, actual clock frequencies will be chosen according to system requirements and dither-signal samples will be generated in synchronism with the corresponding clock pulses, substantially as shown in FIG. 1A.

FIG. 8 shows the CLH input to have the standard NTSC horizontaL sync frequency of 15,734 pps. The frequency of vertical sync CLV, although actually 59.939 pps. in the NTSC system, is rounded to 60 pps., merely for convenience. One-stage binary counter 75 of FIG. 8 counts CLH pulses to produce a square-wave output signal H having frequency of $\frac{1}{2}(15,734)=7867$ Hz. Also, 3-stage binary counter 76 counts CLV pulses, resulting in square-wave outputs V at 30 Hz., F at 15 Hz. and G at 7.5 Hz. Lines-logic unit 80 receives all four square waves. These are equivalent to binary signals alternating between 0 and 1 and unit 80 generates four binary functions thereof, viz:

$$J = V \oplus F$$

$$K = V \oplus G$$

$$L = H \oplus V \oplus F$$

$$M = H \oplus F$$

where $\oplus$ indicates the "exclusive-or" logic operation. These four functions are delivered to each of three pels-logic units designated 82, 83 and 84.

Two-stage counter 77 of FIG. 8 counts the 8 Mpps. CLY pulses, from which it generates a 4 MHz. square wave $D_1$ and a 2 MHz. square wave $C_1$ and these two square waves are furnished to pels logic unit 82 in addition to J, K, L, and M from unit 80. Digital logic circuits of unit 82 generate four binary outputs, as follows, from the six inputs:

$$W_1 = J \oplus C_1 \oplus D_1$$

$$X_1 = K \oplus C_1$$

$$Y_1 = L \oplus D_1$$

$$Z_1 = M \oplus D_1$$

$W_1$ and $X_1$ are essentially a pair of 2-MHz. square waves, separated 90° in phase. Each undergoes phase reversals between some raster fields (60 reversals per sec. or less). Likewise, $Y_1$ and $Z_1$ are essentially 4 MHz. square waves which undergo phase reversals between most, but not all, line scans (approx. 15,734 reversals per sec.). D/a converter means 86 converts the set of four square waves into a 3-dimensional nasik dither signal DY, as described in the aforementioned prior application. In the present instance, DY is generated with sixteen sizes of amplitude and the amplitude changes $8 \times 10^6$ times per second, in synchronism with CLY.

Means for generating DI and DQ are similar to the DY means, except that other clock frequencies are supplied to counters 78 and 79. The 3 Mpps. CLI clock furnished to counter 78 results in 0.75 MHz. square waves $W_2$ and $X_2$, and 1.5 MHz. square waves $Y_2$ and $Z_2$, which d/a converter 87 transforms into 3-dimensional nasik dither DI; it changes $3 \times 10^6$ times per second, in synchronism with CLI. Likewise, the 1 Mpps. CLQ clock is supplied to counter 79 and eventually results in the $W_3$, $X_3$, $Y_3$ and $Z_3$ square waves from which d/a converter 88 generates DQ; the latter changes $10^6$ times per second, in synchronism with CLQ.

The initial states of the various counters of FIG. 8 relative to one another is not critical.

I may, if I wish, implement each of d/a converters 86, 87 and 88 by means of a 4-input summing amplifier arranged, in accordance with well-known art, to multiply the W, X, Y and Z inputs by weights chosen so as to convert the continually-changing binary number WXYZ to an equivalent analog signal. The prior application teaches ways in which another number of amplitude sizes may be provided, instead of the sixteen sizes produced according to the example of FIG. 8. Assuming, however, sixteen sizes with a mean value of zero, a suitable peak-to-peak amplitude for the DX dither signal supplied to 4-level dither coder 420 of FIG. 2C is (15/16)e. In the case of the 2-level quantizer 415, shown in FIG. 2A, the peak-to-peak DX amplitude may be approximately 15/16 the range of X values; this provides linear dither coding; I may, however, use another peak-to-peak value and/or non-zero mean dither to effect gamma control in the chrominance components and to adjust color balance.

COLOR TELEVISION STORAGE SYSTEMS

Presently available video recording systems generally store information on tapes, disks, or the equivalent, using various techniques known to the art such as magnetic or photographic storage, electromechanical cutting or embossing, and etching or ablation of films by electron beams or lasers.

Video recording systems of prior art typically store and reproduce composite signals encoded in a manner not compatible with a standard NTSC receiver. Therefore, playback means of such a system may decompose the recorded composite signal and supply separate video components to self-contained means equivalent to matrix 136 and display 137 of FIG. 4. Alternatively, the playback means may reencode the components into NTSC format compatible with the normal input of a standard NTSC broadcast receiver.

Referring to FIG. 3, I may, store composite signal 37 of the invention by means of recorder 20 which may be entirely according to prior art or may be improved as disclosed below, especially for videodisk records of the invention. If necessary, a different composite-signal encoder, acceptable to recorder 20, may be substituted for NTSC encoder 10 of FIG. 3.

The dotted line 32 of FIG. 3 represents information optionally supplied from means 30 to recorder 20 whereby a signal suitable for clocks synchronization is stored on the record separately from composite signal 37. The prior application, now U.S. Pat. No. 4,460,924 discloses how such a separate clocking signal facilitates regeneration of dither-quantized video information played back from the record. One example of the clocking signals I may so record is the 20 pulses/sweep signal from frequency multiplier 48 of FIG. 5; another is a sum of fundamental clock frequencies further described below. The prior application points out that a circular clocking track is sufficient for a disk record having the composite video signal recorded on a continuous spiral of much greater length.

IMPROVED VIDEODISK

The existing art provides various systems of nonerasible videodisk records and related reproducing equipments. A suitable one thereof may be selected as a standard system and its components will be referred to herein as standard components.

Figure 9:
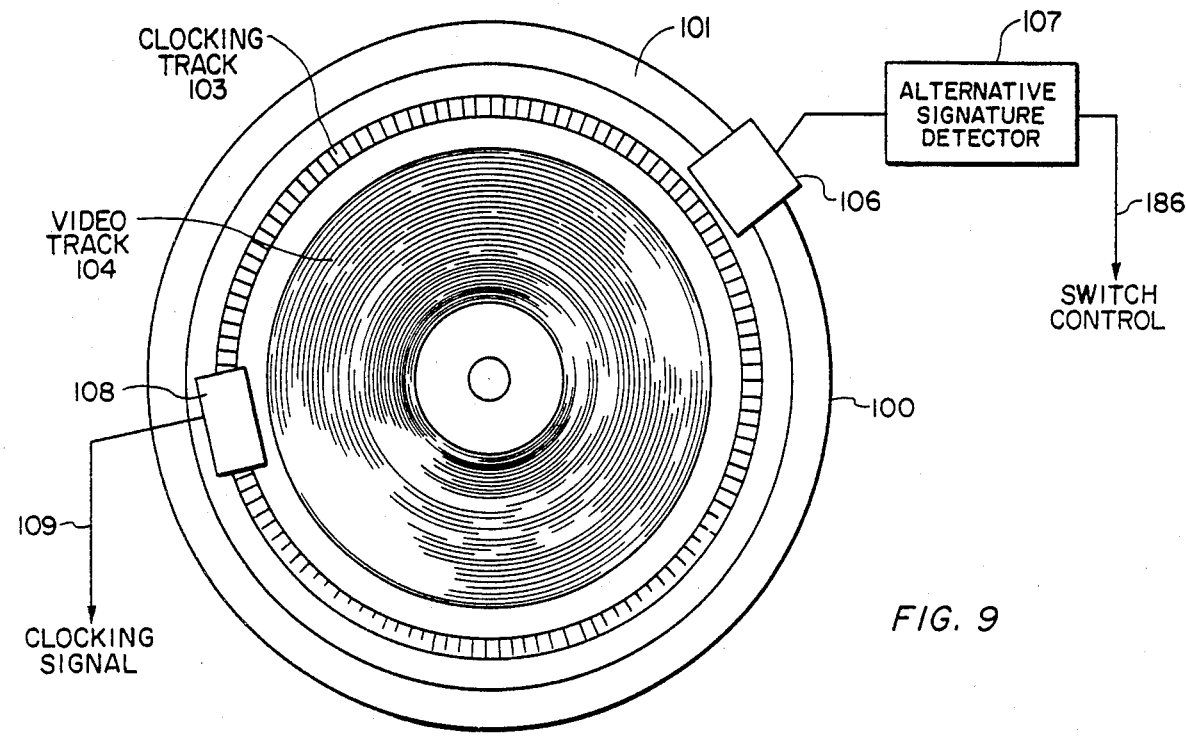
FIG. 9 shows a novel videodisk record of the invention, which is playable on both a conventional reproducer of prior art and a novel noise-reducing reproducer of the invention.

Videodisk 100 of FIG. 9 is a novel videodisk record of my invention, so arranged that it can replace a standard videodisk in a standard reproducer. Whereas the standard videodisk includes a spiral track on which is stored a composite signal comprising non-regenerable analog video components, the similar spiral track 104 of the novel videodisk stores a composite signal of the invention comprising regenerable video components. If the same moving picture is stored on both the novel and the standard videodisks and the records are played on the standard reproducer, a human observer perceives substantially the same picture in both cases. However, the novel videodisk, but not the standard one, can alternatively be played on a reproducer which regenerates its video components. The novel record of the invention therefore combines desirable features of a standard videodisk record with a potential for noise and distortion reduction not present in the standard record. My invention may therefore afford better picture quality from video disks replicated by present processes, and also permit simpler or more economical manufacturing of records and reproducers without reducing perceived picture quality.

Figure 11:
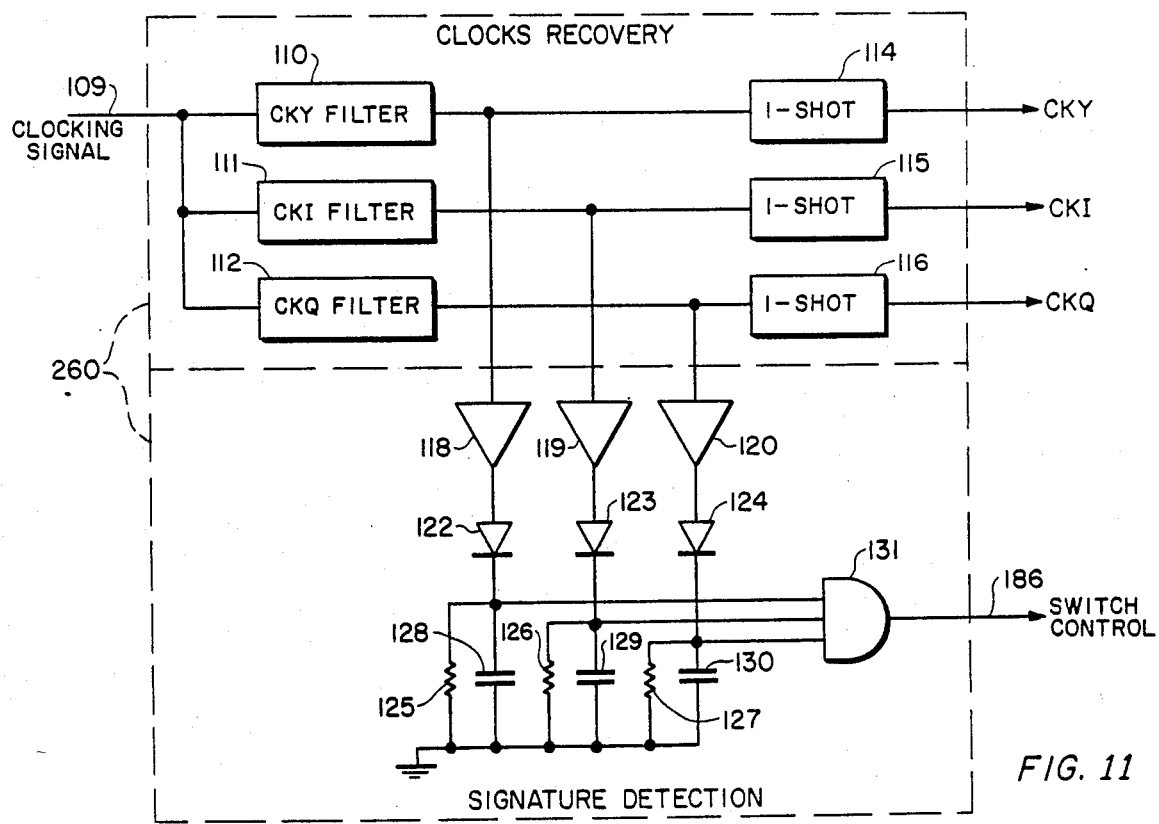
FIG. 11 shows means for extracting separate clock signals from a combined signal stored on the record of FIG. 9 and also shows means for recognizing certain videodisk records of the invention.
Figure 10:
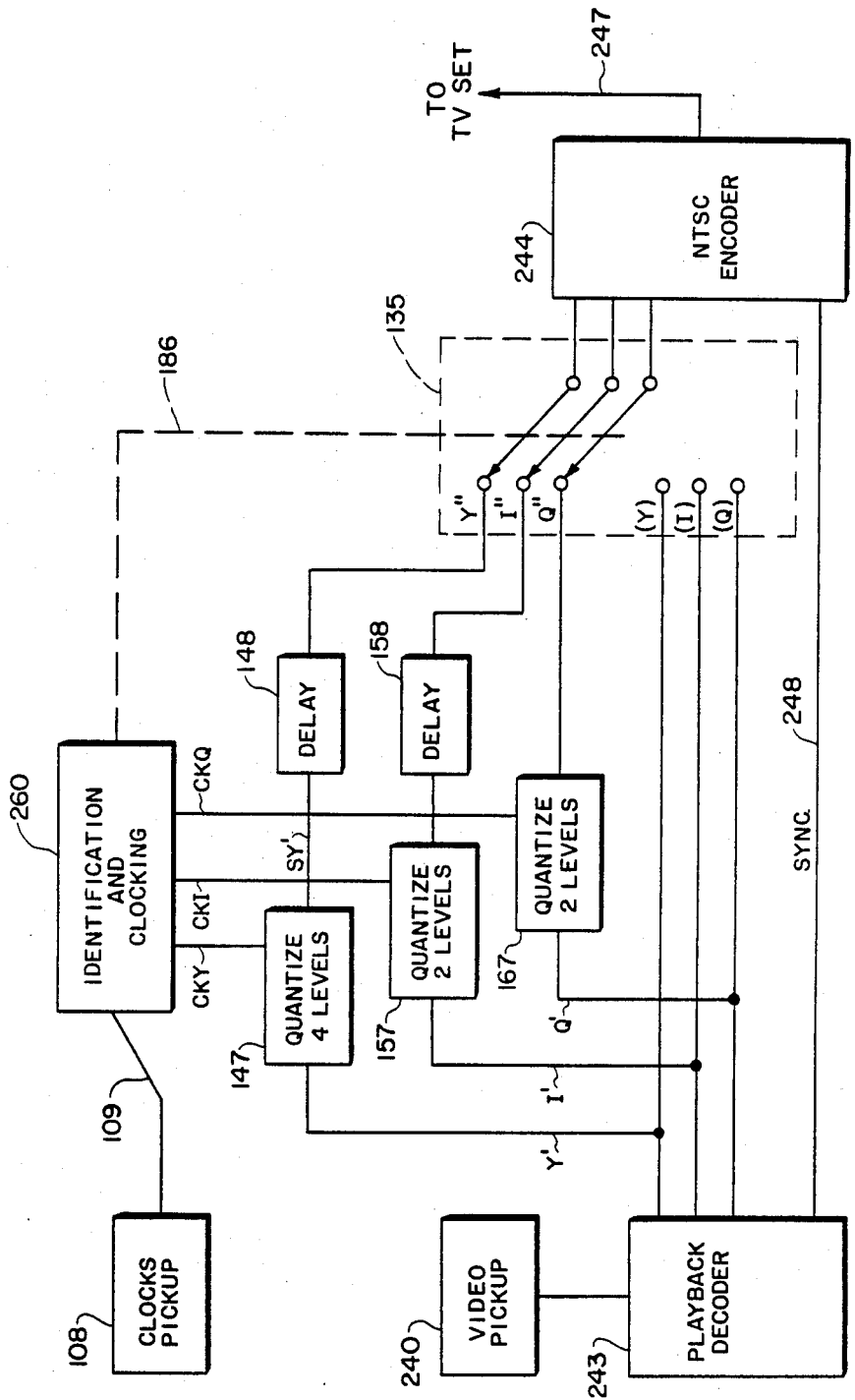
FIG. 10 shows improved reproducing means for playing back with reduced noise the novel videodisk record of FIG. 9, also arranged to play compatible records of the prior art.

In videodisk record 100 of FIG. 9, I prefer to include clocking means and signature means which are useful in connection with the reproducer of FIGS. 10 and 11. Circular clocking track 103 therefore stores a combined signal 109 sufficient to generate the CKY, CKI and CKQ clock signals of FIG. 10 in pickup unit 108 which, although shown on FIG. 9, is part of a reproducer. Each of the three clock signals has an integral number of pulses per television frame and, in accordance with typical practice, spiral track 104 (like the standard record track) includes an integral number of television frames (usually four) per rotation. Consequently, a circular track 104 is sufficient to clock the entire record. Combination signal 109 may comprise a sum of the three clock signals (or principal Fourier components thereof) from which three different fundamentals frequencies can be extracted by filtering in the reproducer. Although electrical filters are shown in FIG. 11, other embodiments are feasible. For example, assuming that track 103 records an optical signal, an optical embodiment of pickup 108 may read separately through three different gratings, each grating arranged to transmit only one clock frequency and to reject the other two.

A "signature" may be incorporated into record 100 to automatically indicate to the dual-mode reproducer of FIG. 10 that the video components are regenerable and not merely those of prior art. Although the signature could be any convenient feature not present on the standard record, such as a peculiar record diameter, an extra hole, or a special signature track 101 operating in conjunction with alternative signature detector 107, I prefer to use the presence of the novel clocking signal 109 as a signature.

DUAL-MODE VIDEODISK REPRODUCER

FIG. 10 illustrates dual-mode playback means which reencodes the recorded signal, either in the manner of a standard videodisk reproducer when playing a standard videodisk record, or else in the manner of a noise-reducing playback means when playing record 100 of FIG. 9. Although the drawing shows automatic mode-changeover based on signature detection, it will be obvious that manual operation of switch 135 is also feasible and does not demand the signature.

When a standard record is played, the signature is absent, so switch 135 is set to the lower contacts (not as shown) by electromechanical control 106 or other suitable means of prior art. Video pickup 240 generates an electrical representation of the recorded composite signal which playback decoder 243 converts to Y, I and Q components, shown in parenthesis. As a rule, the composite input signal is not encoded in the NTSC manner and standard playback-decoder 243 is not the same as NTSC decoder 133. Sync 248 and audio (not shown), together with Y, I and Q, are re-encoded in NTSC format on a suitable carrier in encoder 244 whose output is supplied to an NTSC broadcast receiver by means of lead 247. The system including pickup 240, decoder 243 and encoder 244 operates like a standard reproducing means of the prior art and therefore will not be described further.

When novel videodisk record 100 of the invention is played, clocks pickup 108 delivers combined clocks signal 109 which is recognized as a signature in identification and clocking means 260. Control means 186 therefore operates switch 135 so as to connect encoder 244 to the upper set of input leads, as actually depicted in FIG. 10. Switch 135 may be an electromechanical switch, as suggested by the drawing, or purely electronic means comprising switchable dual amplifiers. In this mode of operation, playback decoder 243 delivers dither-coded video components Y', I' and Q' and identification and clocking unit 260 (shown in detail in FIG. 11) delivers clocks CKY, CKI and CKQ to quantizers 147, 157 and 167.

It is assumed that Y', I' and Q' of FIG. 10 are similar to the like-denoted NRZ signals of FIGS. 3 and 4, except that the various bandwidths may be different. In particular it is assumed that Y' is quantized with four levels and I' and Q' with only two levels. Clocks CKY, CKI and CKQ are synchronized to the video components by means of track 103 of videodisk 100; their respective pulse rates are suitable for the corresponding component bandwidths and are not necessarily those of FIG. 4.

Four-level quantizer 147 of FIG. 10 regenerates like the like-designated unit of FIG. 4. It resamples Y' with clock CKY, requantizes and stores each sample, and delivers NRZ output SY' to delay unit 148. The latter may be similar to 148 of FIG. 4. The regenerated and delayed video component Y" of FIG. 10 goes to an input of NTSC encoder 244.

Also, 2-level quantizer 157 regenerates I' of FIG. 10 in synchronization with clock CKI, and delay unit 158 retards the regenerated signal, in the same manner as like-designated means in FIG. 4. Likewise, 2-levels quantizer 167 regenerates Q' of FIG. 10 with the aid of clock CKQ of the figure. The regenerated chrominance components I" and Q" are supplied to inputs of encoder 244, the Y'—Y", I'—I" and Q'—Q" delays being equalized by suitable adjustment of the retardation in units 148 and 158. If the video bandwidths are significantly different in FIGS. 10 and 4, the required channel-delay adjustments may differ accordingly. NTSC encoder 244 re-encodes Y", I" and Q" into NTSC format on a suitable carrier.

It will be understood that, instead of re-encoding them into NTSC format for use in a conventional broadcast receiver, I may, if I wish, deliver the luminance and chrominance signals directly to a matrix unit and display unit such as 136 and 137 of FIG. 4.

FIG. 11 shows in detail an exemplary embodiment of the clocking and identification unit 260 of FIG. 10. Clocking signal 109 of FIG. 11 is generated in the separate pickup device 108 of FIG. 10 as a sustained oscillation which includes the fundamental frequencies of all three clocks. A bank of narrow-band filters 110, 111 and 112 extract the fundamental frequencies to furnish three isolated signals having at least approximately sinusoidal waveshapes. As shown in FIG. 11, the output of filter 110 goes to 1-shot multivibrator circuit 114 which triggers after every, say, positive-going axis-crossing and delivers a delayed pulse. The resulting stream of pulses is clock CKY.

Narrow-band filter 111 and 1-shot multivibrator circuit 115, and narrow-band filter 112 and 1-shot multivibrator circuit 116, cooperate in similar fashion to produce clocks CKI and CKQ. The amount of fixed delay introduced by each of the three multivibrators is preferably set to adjust the phase of each clock signal for optimum resampling in a quantizer.

The output from narrow-band filter 110 is additionally furnished, preferably through amplifier 118, to rectifier 122, so that capacitor 128 charges up when, and only when, the CKY fundamental frequency is present in input 109. Likewise, the output from filter 111 is furnished through amplifier 119 to rectifier 123 so that capacitor 129 may charge up when the CKI fundamental frequency is present, and the filter 112 output is sent through amplifier 120 to rectifier 124 so that capacitor 130 may charge up with CKQ. Capacitors 128, 129 and 130 are shown shunted by resistors 125, 126 and 127; a suitable time-constant for each resistor-capacitor combination would be one second and we may assume that the capacitors store positive charges. The junction between each capacitor and its rectifier is connected to one of the three inputs to AND gate 131, whereby gate output 186 has one binary state when all three fundamental frequencies are present in clocking signal 109 and the alternate binary state otherwise. Output 186 is therefore suitable for control of switch 135 when enabled by the signature comprising all three clocks simultaneously.

It will be obvious to persons skilled in the art that I may in, similar fashion, employ more or less than three signature frequencies, and frequencies other than the clock frequencies, for signature detection. The manner in which binary signal 186 controls either an electromechanical or electronic embodiment of switch 135 is well known to the art and therefore need not be detailed.

VIDEODISK RECORDING

It should be understood that videodisk records fabricated as described herein may be the master records from which copies are made, using processes outside the scope of the invention.

Recorder 20 of FIG. 3 can be embodied in a videodisk recorder of prior art. I may, for example, use the phase-lock system of FIG. 6 to generate clocks and regenerate horizontal and vertical sync signals, and may synchronize the rotation of a disk-recording turntable with vertical syn CLV. I prefer to add circular clocking track 103 to the videodisk record. A suitable clocking signal is the sum of the CLY, CLI and CLQ clocks (or principal frequency components thereof) which may be transmitted on lead 32 from generator circuits 30 to recorder 20. Inasmuch as there is normally an integer number (usually four) of television frames per disk revolution, and an integer number of clock pulses per frame, a circular clocking track suffices to serve the spiral video track of much greater length. I may record the clocking signal at the same time that the composite video signal is recorded. Alternatively, I may imprint track 103 beforehand on the blank recording disk (or on a revolving surface rigidly connected to the disk during recording), read the recorded signal with pickup unit 108 of FIG. 9 or an equivalent during recording, generate CLY, CLI and CLQ clocks in the manner of FIG. 11, and transmit the clocks back on lead 32 to unit 30, eliminating clocks generator 134.

Turntable means and associated means for accurately recording a composite color-television signal on a spiral videodisk track are of the prior art. They are augmented in FIG. 12 by novel means of the invention for providing plural dithers and clocks accurately synchronized to the turntable rotation and by additional means for recording a separate clocking track.

Figure 12:
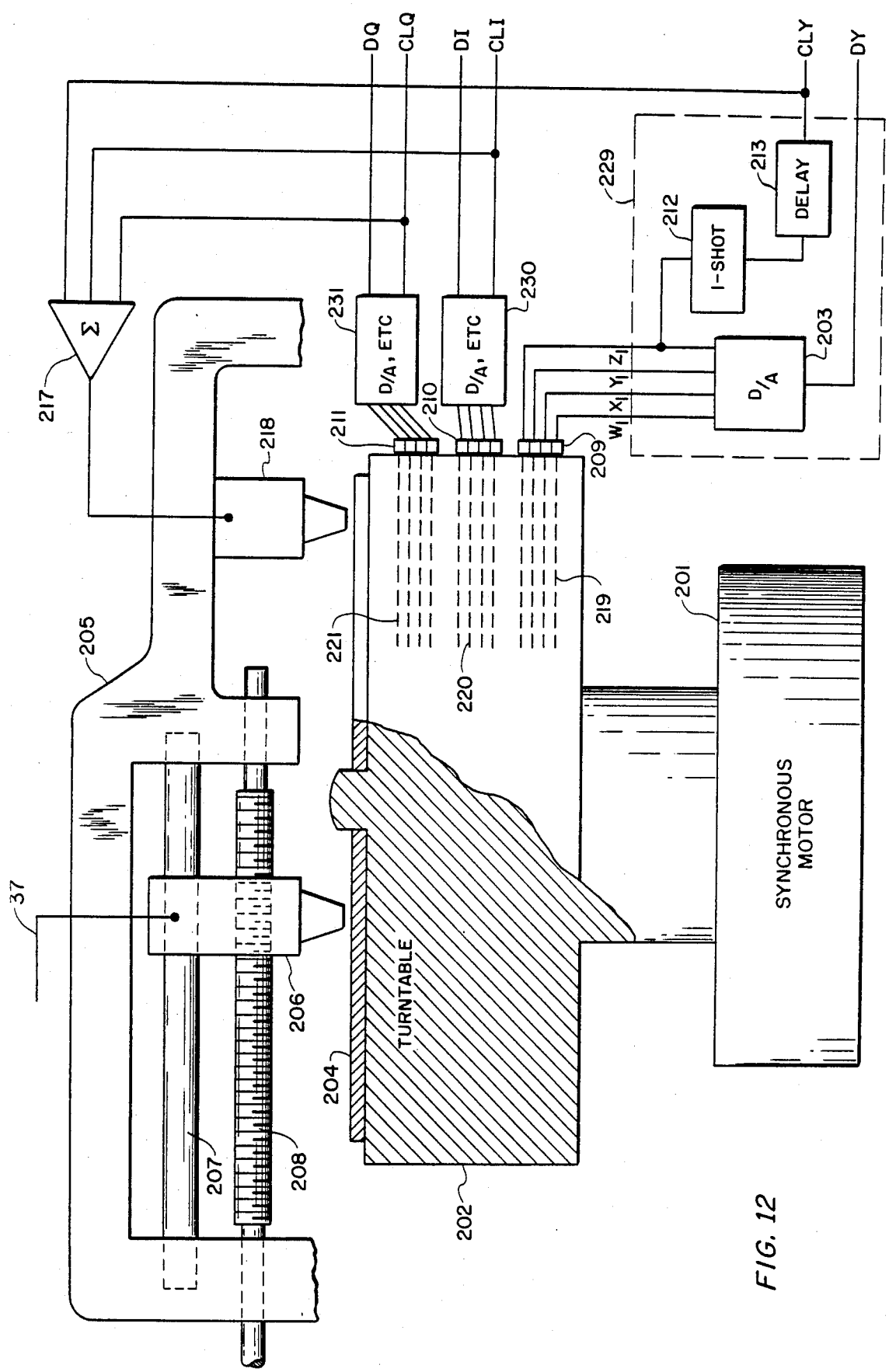
FIG. 12 shows novel means useful in the manufacture of the record of FIG. 9.

In Accordance with only prior art, turntable 202 of FIG. 12 is mounted as shown on the rotor of synchronous motor 201. Recording blank 204 is securely fastened to the turntable surface which the motor rotates with constant angular velocity, very nearly 450 r.p.m., corresponding to four NTSC frames per revolution. Rigid support 205 carries linear bearing surface or ways 207 and leadscrew 208. The lead screw is geared to motor 201 by means not shown in the figure and moves recording head 206 along a turntable radius, thereby forming a spiral record track corresponding to track 104 of FIG. 9. Any of various processes known to the art may be used for recording with head 206, including, for example, mechanical cutting or embossing; optical (including laser) recording on photographic emulsions, photo-resists or ablatable films; electron beam hardening of resists; and magnetic recording.

In accordance with my improvement, however, stationary read-out units, exemplified by 209, 210 and 211 of FIG. 12, are also provided and they read out information stored in circular tracks of marks or indicia (exemplified by 219, 220 and 221) which I may engrave or otherwise record on a surface of revolution of turntable 202 or another surface rotating synchronously therewith. The stored information may be read by any suitable means, such as a capacitive, magnetic, or optical method of the prior art. Alhough analog dither signals can be recorded and read out, I prefer to record binary-coded dithers and perform subsequent analog-to-digital conversions. Implicit clocks can be extracted externally, as will be demonstrated.

Referring now to FIG. 12, and assuming sixteen dither amplitude sizes as in FIG. 8, track 219 is divided into four sub-tracks from which 4-part readout 209 reads the binary number $W_1X_1Y_1Z_1$. This binary number, which has the same significance as in FIG. 8, changes continually as the turntable rotates. Means 229 (enclosed in a dotted rectangle) performs d/a conversion to generate DY as a function of turntable position and also generates clock CLY. Assuming the usual four television frames per rotation, DY repeats after four television frames, exactly as required for the 4-phase nasik dither of FIG. 8. However, any 1-, 2- or 4-phase dither pattern can be recorded on track 219.

In similar fashion, track 220 and readout 210 generate $W_2X_2Y_2Z_2$ which means 230 converts into dither DI and clock CLI; likewise track 221, readout 211 and means 231 provide dither DQ and clock CLQ. All of the dithers are preferably 3-dimensional ordered dithers. They are inherently synchronous with the turntable rotation and repeat after each 4-frame rotation. The figure shows a suitable embodiment of means 229 in detail and it should be understood that means 230 and 231 may be similar. Binary number $W_1X_1Y_1Z_1$ is converted to DY by means of d/a converter 203 which is similar to 86 of FIG. 8. Assuming that DY is nasik dither, it has been explained that $Y_1$ and $Z_1$ are both square waves with half the frequency of clock CLY. Therefore, $Z_1$ also goes to one-shot multivibrator 212 of FIG. 12. The multivibrator triggers on both positive-going and negative-going transitions of the square wave and therefore puts out two pulses per cycle of $Z_1$, as required for CLY. Delay unit 213 preferably retards the stream of pulses approximately half a period, so that CLY pulses coincide with the centers of DY pulses, comparable to the relation of CLX to DX in FIG. 1A.

I may employ the recording means of FIG. 12 in conjunction with composite signal conditioning means schematized FIG. 3. The means of FIG. 12 replace both recorder 20 and generator circuits 30 of FIG. 3. Furthermore, inasmuch as recording is frequently done with non-NTSC composite signals, it may be necessary to modify encoder 10 approximately. It is assumed that any signal processing needed to make composite signal 37 suitable for recording head 206 of FIG. 12 is performed in the modified encoder 10.

To record a television picture on the novel videodisk of FIG. 9, therefore, the Y, I and Q luminance and chrominance components which according to prior art would be provided to encoder 10 directly, are first transformed to corresponding Y', I' and Q' signals. The transformation process and means are as has already been described in relation to FIG. 3, except for the source of dithers DY, DI and DQ and clocks CLY, CLI and CLQ. It will also be clear to persons skilled in the art that Y, I and Q may be recorded with bandwidths other than the standard NTSC bandwidths, requiring corresponding adjustment of clock rates.

Recording is performed with turntable 202 rotating in synchronism with vertical sync 28 so that there are exactly four (or another full number of) television frames per revolution, composite signal 37 being provided to recording head 206 which moves radially and forms a spiral track on the disk, all according to prior art. According to the invention, however, the rotating turntable also generates dithers DY, DI and DQ and clocks CLY, CLI and CLQ in conjunction with pickups 209, 210 and 211 and the associated units 229, 230 and 231 and these dithers and clocks are supplied to quantizers 2, 12 and 22 of FIG. 3.

Prior art recording head 206 could be moved to the extreme right of FIG. 12, and held stationary with screw 208 disengaged, for the recording of clocking track 103 of FIG. 8, either before or after video track 104 is recorded. However, I prefer to provide a second, fixed, recording head 218 for this purpose. This facilitates the use of different prior-art recording techniques for the spiral and circular tracks and also permits the clocking track to be made while video is being recorded.

For clocking track 103, the CLY, CLI and CLQ clock signals are combined in a summing amplifier 217, as shown in FIG. 12, and their sum (or principal frequency components thereof) is recorded by means of fixed recording head 218.

Without departing from the spirit of the invention, I may prerecord tracks 219, 220 and 221 on a blank recording disk 204 and read recorded dithers from the disk with pickups 209, 210 and 211, instead of from a surface of the turntable.

TRANSMISSION OF SECURE TELEVISION

I may encrypt the video components incorporated into composite signal 37 of FIG. 3, to conceal the transmitted picture information except on a suitable receiver possessing the correct private code or password. Encryption in accordance with the invention continually rearranges the quantum levels of a dither-coded video component, in more or less random fashion, without changing the number of levels or the signal bandwidth. I may therefore transmit an encrypted picture by means of the NTSC composite signal and I may modify the noise-reducing receiver of FIG. 4 to both regenerate and decrypt.

Figure 13:
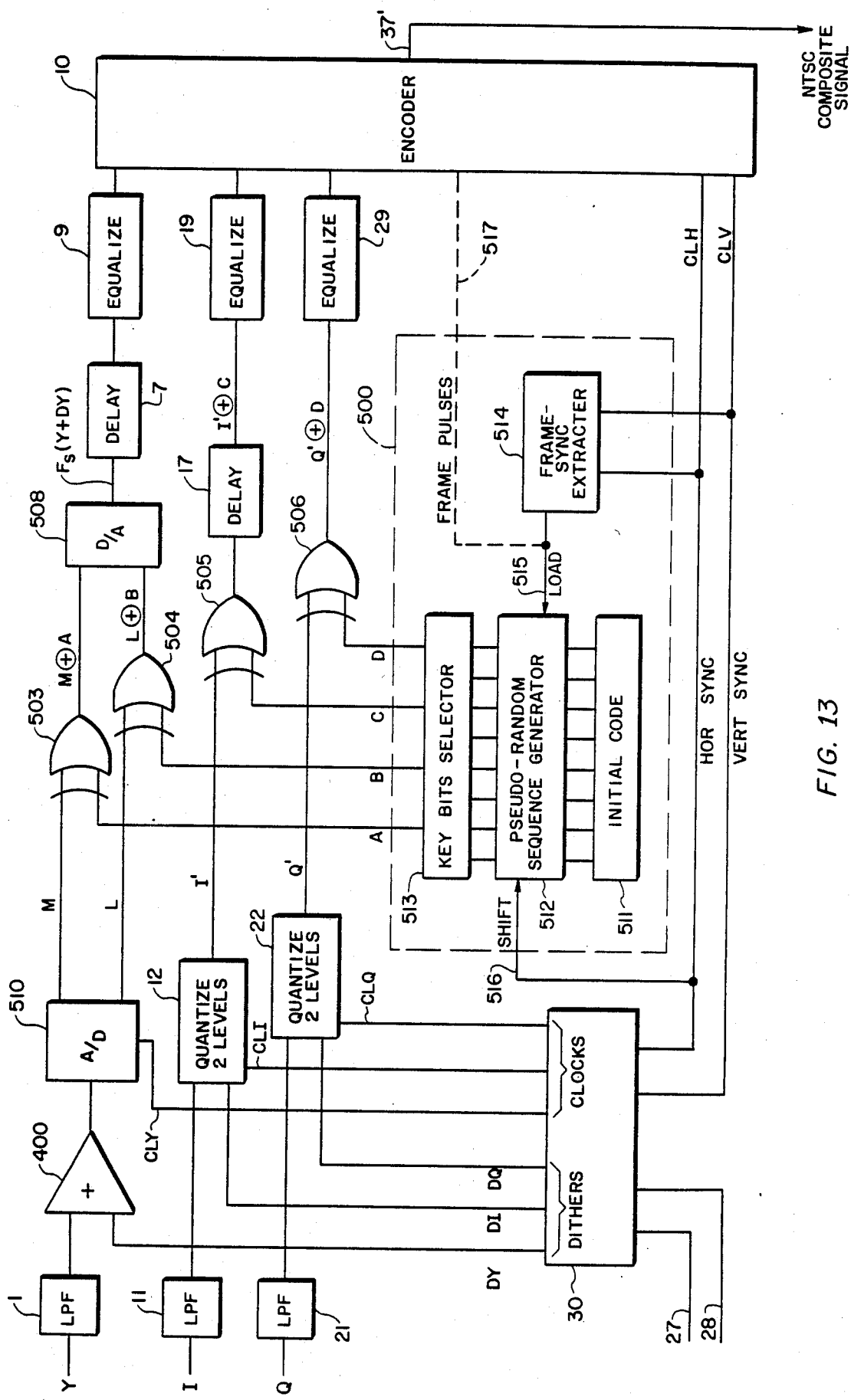
FIG. 13 is a diagram useful for explaining an embodiment of the invention which transmits an enciphered television picture on a regenerable compatible television signal of the invention.

FIG. 13 represents the conditioning system of FIG. 3 further arranged to encrypt a color picture according to key bits A, B, C, and D which vary with time and which key generator 500 provides. In general, the dotted box 500 represents any suitable key generator, including one of the prior art, while the component parts shown inside the dotted box refer to a self loading line keyer, to be described later. FIG. 13 has quantizer 2 of FIG. 3 embodied in the tandem combination of 2-bits a/d converter 510 and 2-bits d/a converter 508. However, the more-significant bit M is transmitted from unit 510 to unit 508 through exclusive-or gate 503 and the less-significant bit L is transmitted through exclusive-or gate 504, the other inputs to these gates being respectively A and B from the key generator. Therefore, M becomes M⊕A, L becomes L⊕B, and, unless A=B=0, the 4-level output $F_s(Y+DY)$ from the d/a converter is not the same as F(Y+DY) of FIG. 3.

Inasmuch as quantizer 12 has only two output levels in FIG. 13, exclusive-or gate 505 combines binary signal I' from unit 12 with bit C from the key generator, forming I'⊕C. Likewise, exclusive-or gate 506 combines Q' with bit D, forming Q'⊕D.

Except for means replacing Y', I' and Q' (or any of them) by $F_s(Y+DY)$, I'⊕C and Q'⊕D as described, the means of FIG. 13 are similar to those of FIG. 3 and they transmit a composite signal 37' which is similar to 37 of FIG. 3 except that the picture is concealed by encryption. (The dotted-line connection 517 pertains to an option to be described later.)

Figure 14:
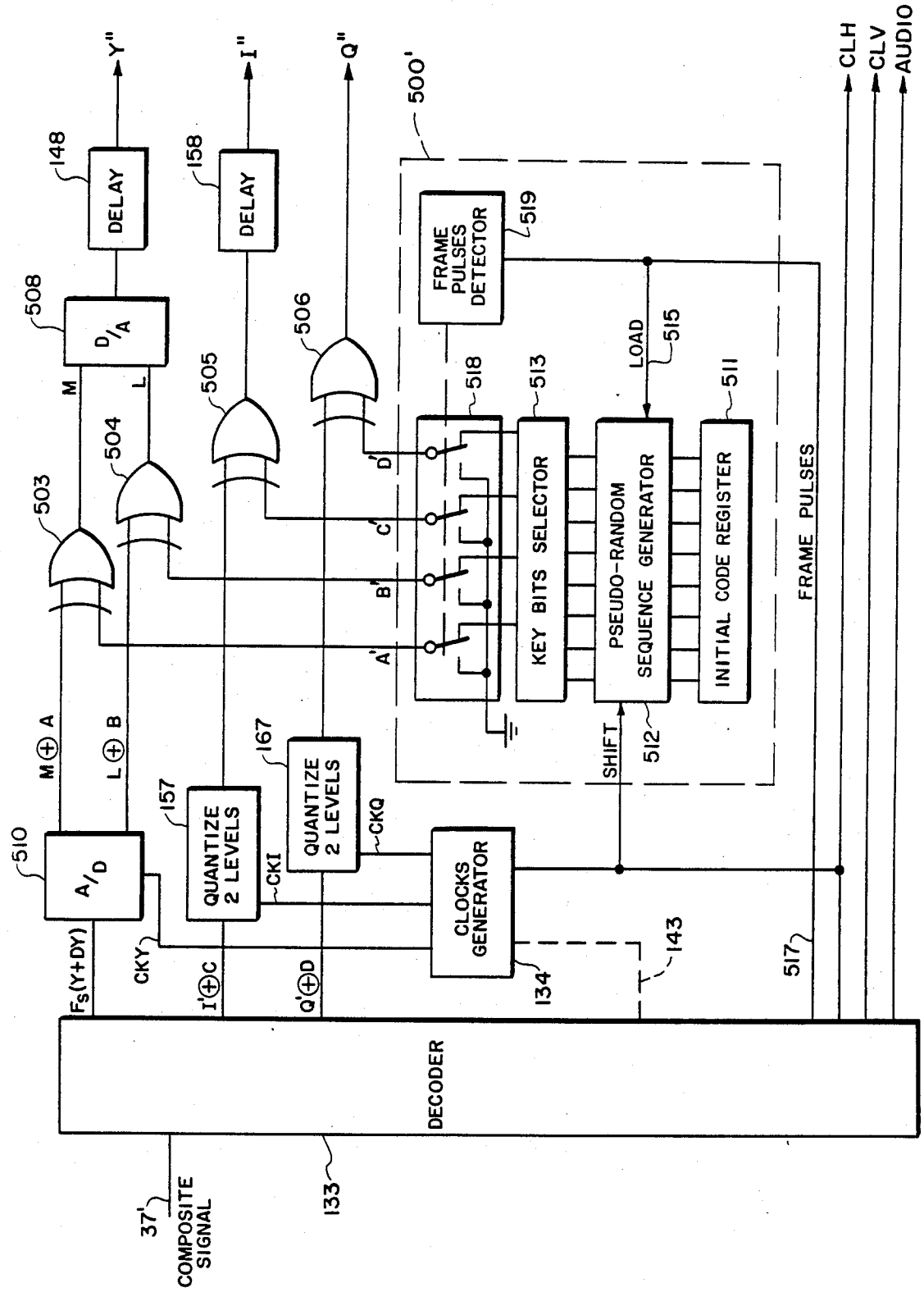
FIG. 14 is useful to explain deciphering of said enciphered picture in a receiver embodiment of the invention.

FIG. 14 shows a portion of the receiver of FIG. 4 modified to receive and decrypt composite signal 37' so as to display a clear picture. Four-level quantizer 147 of FIG. 4 is replaced by the same combination of a/d converter 510, d/a converter 508 and exclusive-or gates 503 and 504 shown in FIG. 13. Also, exclusive-or gates 505 and 506 are inserted at the outputs of 2-level quantizers 157 and 167, and key-generator 500' is provided to furnish key bits A', B', C' and D', which are second inputs to each of the four gates, as shown. In general, the dotted box 500' of FIG. 14 represents any suitable counterpart to key generator 500 of FIG. 13, including one of prior art. Although the self loading line keyer shown in FIG. 13 may be used for both unit 500 of the transmitter and 500' of the receiver, the component parts actually shown inside dotted box 500' of FIG. 14 refer to a transmitter loaded line keyer, suitable for only the receiver as will be explained presently, and requiring frame pulses 517 from decoder 133.

Assume that key generators 500 and 500' are synchronized so that A'=A, B'=B, C'=C and D'=D. Decoder 133 of FIG. 14 decomposes composite signal 37' into separate signals including $F_s(Y+DY)$, I'⊕C, and Q'⊕D. Two-bit a/d converter 510 digitizes $F_s(Y+DY)$ to recover the binary signals M⊕A and L⊕B. The latter become M and L after exclusive-or combination with A' and B', as shown, since M⊕A⊕A=M and L⊕B⊕B=L. Finally, d/a converter 508 converts M and L into a 4-level signal which is the same as F(Y+DY) of the transmitter. In similar fashion, I'⊕C is exclusive-ored with C' to recover I', ad Q'⊕D is exclusive-ored with D' to recover Q'. A/d converter 510 and quantizers 147 and 157 also regenerate the signals they process, thereby eliminating most channel noise. Delay-compensated outputs are labelled Y''', I'' and Q''.

For maximum cryptographic security, each of the three video components should be encrypted sample by sample, using three uncorrelated clock-rate sequences of quaternary and binary key digits; assuming the Y', I' and Q' signals of FIG. 3, key-sequence generators delivering a total of almost 20 Mbits/sec. would have to be synchronized at transmitter and receiver. Although such means are within the state of the art, I prefer simpler and more convenient generation of keying sequences for protection of pay television, or for related applications not requiring a highest degree of security.

The means represented inside the dotted rectangle 500 of FIG. 13 correspond to a particularly suitable key generator embodiment called a Self Loading Line Keyer (SLLK); any number of units thereof can be synchronized by means of only the NTSC sync pulses and a locally inserted password which may be held confidential and changed at transmitter and receivers as often as necessary. The Self Loading Line Keyer (SLLK) comprises frame-sync extractor 514, initial-code register 511, pseudorandom sequence generator 512, and key-bits selector 513. The frame-sync extractor, needed because of line interlace, may be any suitable means for selecting the same set of alternate vertical sync pulses at all SLLK's; it may, for example, utilize an oscillator operating at horizontal sweep frequency (15734 Hz.), in synchronism with the horizontal sync pulses, and means for rejecting those vertical sync pulses which are out of phase with the oscillations. The selected pulses occur at frame rate (30 times per second), near the start of every-other vertical retrace interval, and are delivered to load lead 515.

Pseudo-random sequence generator 513 may be of the well-known type employing a binary shift register and requisite feedback logic, register shifting being clocked by horizontal sync pulses CLH furnished on lead 516. Assuming, for purposes of illustration, an 8-stage shift register of the type which can be loaded in parallel, and assuming a maximal-length sequence of binary digits, 0's and 1's move through the shift register in substantially random order until the entire sequence repeats after every 255 shifts.

Upon the occurrence of a frame pulse, initial-code register 511 is interrogated, and a binary code number stored therein is copied into the eight shift-register stages. No shifts occur while the register is being loaded, but shifting resumes thereafter (simultaneously in all interconnected SLLK units) and continues until the next frame pulse. Bits selector 513 chooses output bits A, B, C and D from particular bit-register stages or by logically combining the contents of different stages. It is preferred that at least bits A and B not be always identical.

Such a Self Loading Line Keyer, when placed in a receiver, acquires synchronism with that of the transmitter within a fraction of a second. Thenceforth, it continually replicates the key bits being generated at the transmitter, provided that the same number is stored in both of the initial-code registers 511 and provided that both bits-selectors 513 are adjusted alike. In general, an N-stage maximal-length register can start with any of $2^N-1$ codes. This corresponds to $2^N-1$ possible sequences for one key bit, say A, and there are at least $N-1$ ways to assure that a second bit, say B, is generated with a sequence of 0's and 1's different from that of A. Hence, at least $(N-1)(2^N-1)$ different passwords are possible even if color is suppressed in the receiver, leaving only the luminance picture (in which, as a rule, most of the pictorial information resides). In the case of the assumed 8-stage shift register, this corresponds to at least 1785 different passwords when only a monochrome picture is encrypted or shown. If it is also important to reproduce colors properly, the number of possible passwords is much greater.

A numerical password may be stored in the SLLK by means of manual switches or dials, a punched card, a magnetic card, or any other suitable means of prior art. Part of the password may specify the manner of bits selection in unit 513. Furthermore, I may, if I wish, store or update some or all of the password by means of data added to composite signal 37' during vertical blanking periods. Means for password entry are not, in themselves, part of the invention, and have been omitted from the drawings in the interest of clarity.

When I encrypt with the SLLK, changes occur in the set of key bits only during horizontal blanking, not during active scan of a television line. Therefore, the quantum levels of all encrypted video samples of a line become rearranged according to the same substitution scheme. However, the key bits, and hence the substitution schemes, vary from line to line; this will be called "line-encryption." In the case of the assumed 8-stage shift register, a sequence of ABCD combinations repeats after the 255th and 510th line-scans, then starts anew following the next frame pulse so that all frames of the television raster have the same pattern of line encryption until the password is changed.

NTSC encoder 10 of FIG. 13 and NTSC decoder 133 of FIG. 14 can optionally be modified to transmit frame pulses from transmitter to receiver during alternate vertical blanking intervals, without interfering with reception of composite signal 37' on an otherwise compatible receiver. Such use of the vertical blanking interval to send auxiliary data (found, for example, in the VIR system for broadcast color control) is so well known to the art that no further explanation is needed; therefore, FIG. 13 merely shows a dotted line representing the delivery of frame pulses 517 to encoder 10 and, in FIG. 14, the same frame pulses are transmitted from decoder 133 to key generator 500'.

I may easily interconvert a television transmitter of the invention between the secure mode represented by FIG. 13 and the non-secure mode represented by FIG. 3. For example, I may provide switching means to bypass exclusive-or gates 503–506 or to maintain a static signal equivalent to binary "zero" at inputs of the same gates. I may conveniently transmit frame pulses 517 in the secure mode only, in order that they may also function as a signature for engaging decryption means automatically.

In a system transmitting both secure and non-secure pictures, if I encrypt with the Self Loading Line Keyer, (SLLK) and transmit frame pulses 517, I can use either another SLLK or a TLLK for decryption in a receiver. A Transmitter Loaded Line Keyer (TLLK) is shown schematically inside box 500', set off by dotted lines in FIG. 14. The TLLK comprises initial-code register 511, pseudo-random sequence generator 512 and key-bits selector 513, all similar to, and connected like, the like-denoted units of the SLLK, and it has similar password, entry means which are not shown; there is no frame sync extractor because decoder 133 supplies frame pulses 517 to the load lead 515. When provided with the correct password, TLLK 500' generates line-key bits A', B', C' and D' such that they are the same as A, B, C and D from SLLK 500 of the transmitter.

Additional items shown in box 500' include ganged switch 518 and frame-pulses detector 519. So long as pulses 517 are being received, a detector circuit (which may be similar to one of the clock-frequency detector circuits of FIG. 11) and associated solenoid means move ganged switch 518 to the position shown in the drawing, so that A', B', C' and D' are delivered to gates 503–506 respectively and the received picture is decrypted as described hereinabove. A picture received in the clear is not accompanied by frame pulses; in that case, switch 518 connects the key inputs of all exclusive-or gates to ground (assumed to be binary "zero") so that no decryption logic is performed on M, L, I' and Q'.

In a preferred system for broadcasting by wireless radio or cable to a variety of receivers, I may sometimes send a regenerable television picture in the clear, and at other times send it as a line-encrypted picture accompanied by frame pulses. A picture sent in the clear is clearly displayed on all compatible receivers, including standard NTSC receivers and noise-reducing receivers of the invention not arranged to decrypt. A noise-reducing receiver displays a better picture than a standard NTSC receiver when there is noise or interference on the channel. When I line-encrypt, on the other hand, any secure receiver of the invention, operating with either SLLK or TLLK form of key generator and possessing the correct password, displays a clear television picture; but on other sets the picture is concealed or defaced by line encryption. Transition from secure to non-secure mode of operation is automatic only on receivers of the invention equipped with TLLK, but only those secure receivers equipped with the SLLK can decrypt if frame pulses 517 are not transmitted.

Multi-level encryption and decryption using a/d and d/a converters, shown in FIGS. 13 and 14 for a 4-level luminance signal, is easily extended to K levels, where K is any intergal power of two. However, when K is a non-integral power of two, this method increases the number of levels in the encrypted signal. In such cases, it is preferable to encrypt by adding K-ary key digits modulo-K, and to decrypt by subtracting the same key digits modulo-K. This can be done either by replacing exclusive-or gates with arithmetic units or in analog fashion, using K-level key pulses and a modulo-K quantizer. One example of a suitable modulo-K analog quantizer is a multi-level quantizer, similar to that of FIG. 2C but having the output of the (K−1)th comparator reversed in sign and adjusted in magnitude such that the Kth output level from summing amplifier 406 is the same as level I. No advantage is seen for the modulo-K method when K is an integral power of two.

Various alternatives and modifications to the specific structures set forth herein will be obvious to persons having ordinary skill in the art. For example, although quantization of component signals has been consistently exemplified by 4-level quantization of luminance and 2-level quantization of two chrominance components, it will be appreciated that any video components may be quantized with two, three, four or more levels, and some may even remain unquantized, without departing from the spirit of the invention. It will also be apparent to those of ordinary skill in the art, that, even though compatibility has been illustrated in relation to standardized broadcast and recording formats, the invention applies equally to all sorts of composite television signals which provide analog subchannels for transmission of video components.

Hence, while this invention has been described in connection with several exemplary embodiments thereof, it will be understood that many modifications and variations thereof will be readily apparent to persons having ordinary skill in the art and that this application is intended to cover any adaptations or variations thereof. Therefore, it is manifestly intended that this invention be limited only by the claims and the equivalents thereof.

I claim:

1. Signalling apparatus generating a regenerable composite signal sufficient for a colored television picture and interchangeable with another composite signal for display of said colored picture on a television receiver;

said another composite signal comprising a set of analog video signals, each characterized by samples allowed any amplitude in a range of amplitudes;

said apparatus comprising:

means for obtaining a set of signals equivalent to the set of analog video signals of said another composite signal;

dither-quantizing means modifying said equivalent set by combining a signal with dither and by quantizing samples of the combined signal according to plural discrete values of amplitude; and encoder means for incorporating the modified set of signals into a composite signal compatible with said television receiver.

2. Television signalling means generating a regenerable composite signal sufficient to produce a color picture when applied to input terminals of a television receiver;

said receiver arranged to also display a color picture when a first composite signal is applied to said input terminals;

said first composite signal comprising a first set of analog-signal video components, each corresponding to signal samples having a continuous range of possible amplitudes;

said regenerable signal comprising a second set of video components including a component characterized by signal samples having amplitudes restricted to discrete quantum levels;

said signalling means including:

dither coding means for obtaining the component characterized by samples restricted to discrete quantum levels; and means for encoding said second set of video components into a composite signal interchangeable with said first composite signal for application to said input terminals to display a color picture.

3. The signalling means of claim 2 wherein said dither coding means employs 3-dimensional dither.

4. The signalling means of claim 2 wherein said dither coding means employs nasik dither.

5. The signalling means of claim 2 wherein each video component of said regenerable composite signal corresponds to an analog-signal component of said first composite signal and has substantially the same bandwidth as said analog-signal component.

6. The signalling means of claim 2 wherein the video components of said regenerable composite signal comprise a luminance component and two chrominance components.

7. The signalling means of claim 2 wherein samples of a component signal have amplitudes quantized with more than one but less than nine quantum levels.

8. The signalling means of claim 2 wherein said samples are quantized with two levels.

9. The signalling means of claim 2 wherein a luminance component and a chrominance component are both dither coded, the former with more quantum levels than the latter.

10. The signalling means of claim 2 wherein said first composite signal is a standard broadcast signal and said receiver is a standard broadcast receiver.

11. The signalling means of claim 10 wherein said receiver is an NTSC broadcast receiver.

12. Means for recording picture information comprising the signalling means of claim 2 and recording means suitable for the regenerable composite signal.

13. The signalling means of claim 2 corresponding to regenerable and first composite signals such that a viewer perceives substantially equivalent television pictures, regardless of which composite signal is applied to said input terminals.

14. The television signalling means of claim 2 including means for generating a set of video components for color television.

15. A television system comprising the signalling means of claim 2 and receiving means;

said receiving means including means to requantize amplitudes of samples of a dither coded component signal.

16. The system of claim 15 wherein said receiving means includes means to resample a dither coded component signal.

17. The system of claim 15 wherein samples are binary samples and said receiving means requantizes with two amplitude levels.

18. An improved video record storing color television information and interchangeable with another record for playing on a reproducer;

said another record storing said television information encoded in terms of a first composite signal comprising a set of analog video components, each said component confined to a band of frequencies and corresponding to samples having a continuous range of possible amplitudes;

said improved record storing said television information encoded in terms of a regenerable composite signal comprising video components, including at least one component having substantially the same bandwidth as a corresponding component of said first composite signal but corresponding to samples quantized according to more than one quantum level of amplitude;

said reproducer detecting and processing said another and said regenerable composite signals in the same manner to display the recorded television information.

19. The improved video record of claim 18 wherein said quantized samples result from dither coding with 3-dimensional dither.

20. The video record of claim 18 wherein the video components of said regenerable composite signal are luminance and chrominance components.

21. The video record of claim 18 having a dither-coded luminance component and a dither-coded chrominance component, the former quantized with more levels than the latter.

22. The improved video record of claim 18 including also a clocking track on which is recorded a signal having one or more frequency components for the generation of one or more clock signals.

23. The improved video record of claim 22 provided in the form of a videodisk and having a spiral track for the regenerable composite signal and a circular clocking track for generating clock signals.

24. The improved video record of claim 18 provided in the form of a videodisk.

* * * * *